(12) United States Patent
Tong

(10) Patent No.: US 12,500,291 B2
(45) Date of Patent: Dec. 16, 2025

(54) POWER SUPPLY APPARATUS AND COMPONENTS THEREOF (VENTING)

(71) Applicant: Yui Lung Tong, Hong Kong (HK)

(72) Inventor: Yui Lung Tong, Hong Kong (HK)

(*) Notice: Subject to any disclaimer, the term of this patent is extended or adjusted under 35 U.S.C. 154(b) by 546 days.

(21) Appl. No.: 17/293,926

(22) PCT Filed: Dec. 2, 2019

(86) PCT No.: PCT/IB2019/060357
§ 371 (c)(1),
(2) Date: May 14, 2021

(87) PCT Pub. No.: WO2020/110095
PCT Pub. Date: Jun. 4, 2020

(65) Prior Publication Data
US 2022/0013831 A1    Jan. 13, 2022

(30) Foreign Application Priority Data
Nov. 30, 2018   (HK) ................................ 18115392.2

(51) Int. Cl.
*H01M 10/6566*    (2014.01)
*H01M 10/48*    (2006.01)
(Continued)

(52) U.S. Cl.
CPC ..... *H01M 10/6566* (2015.04); *H01M 10/486* (2013.01); *H01M 10/613* (2015.04);
(Continued)

(58) Field of Classification Search
CPC ........... H01M 10/655; H01M 10/6556; H01M 10/6563; H01M 50/35; H01M 50/358; H01M 50/367
See application file for complete search history.

(56) References Cited

U.S. PATENT DOCUMENTS

| | | | |
|---|---|---|---|
| 6,781,349 B2* | 8/2004 | Kimura | H01M 10/613 |
| | | | 320/112 |
| 9,595,705 B1* | 3/2017 | Buckhout | H01M 50/284 |
| | | (Continued) | |

FOREIGN PATENT DOCUMENTS

| | | | | |
|---|---|---|---|---|
| CN | 203085709 U | | 7/2013 | |
| CN | 106848454 | * | 6/2017 | ............ H01M 10/42 |
| | (Continued) | | | |

OTHER PUBLICATIONS

International Search Report for PCT/IB2019/060357 dated Apr. 15, 2020.

*Primary Examiner* — Amanda J Barrow

(57) ABSTRACT

A power supply apparatus (10) comprising a main housing (200), a battery assembly (100), battery management circuitry (300) and temperature conditioning arrangement. A battery compartment (106) comprises a discharge chamber (108) which is in fluid communication with safety vents of batteries (106). Venting apertures (232) are formed on the discharge chamber (108), and thermal sensors are provided on the discharge chamber (108). The thermal sensors are configured to detect temperature inside the battery compartment (106) and to deliver temperature information to the battery management circuitry (300), which is to activate a counter-measure or temperature conditioning arrangement to condition temperature of the battery assembly (100) when the temperature detected by the thermal sensor or a plurality of thermal sensors reaches an activation threshold temperature.

18 Claims, 10 Drawing Sheets

(51) Int. Cl.
*H01M 10/613* (2014.01)
*H01M 50/367* (2021.01)
*H01M 50/375* (2021.01)
*H01M 10/625* (2014.01)
*H01M 10/6563* (2014.01)

(52) U.S. Cl.
CPC ....... *H01M 50/367* (2021.01); *H01M 50/375* (2021.01); *H01M 10/625* (2015.04); *H01M 10/6563* (2015.04)

(56) References Cited

U.S. PATENT DOCUMENTS

| | | | |
|---|---|---|---|
| 2004/0061480 A1* | 4/2004 | Kimura | H01M 10/633 320/150 |
| 2006/0060236 A1* | 3/2006 | Kim | H01M 10/615 136/203 |
| 2016/0093935 A1* | 3/2016 | Obasih | H01M 10/625 429/71 |
| 2016/0197324 A1* | 7/2016 | DeKeuster | H01M 10/625 429/82 |
| 2018/0131057 A1* | 5/2018 | Takeuchi | H01M 10/6563 |
| 2019/0100093 A1* | 4/2019 | Mizuno | B60H 1/00278 |
| 2019/0214694 A1* | 7/2019 | Yang | H01M 50/512 |

FOREIGN PATENT DOCUMENTS

| | | | | |
|---|---|---|---|---|
| CN | 107579194 A | 1/2018 | | |
| CN | 207038667 U | 2/2018 | | |
| CN | 108666676 A | 10/2018 | | |
| CN | 208078137 U | 11/2018 | | |
| JP | 2012-015121 | * | 1/2012 | .............. H01M 2/10 |

* cited by examiner

POWER SUPPLY APPARATUS AND COMPONENTS THEREOF (VENTING)

FIELD OF DISCLOSURE

The present disclosure relates to power supply apparatus, and more particularly, to power supply apparatus having batteries and components of such power supply apparatus. The disclosure also relates to battery assemblies and components for power supply apparatus.

BACKGROUND

Storage power devices such as batteries have become the main power source of many vehicles and equipment. Power supply apparatus having batteries as a stored power source are beneficial and advantageous. For example, power supply apparatus having a stored power device can input power from the mains for storage during non-operating times and to output power during operating times when power supply is required from the power supply apparatus.

With ever-increasing power requirements, power supply apparatus is required to have a higher energy storage capacity and compactness. Compactness is usually achieved by using batteries having a higher energy storage density and by having batteries or battery cells more closely packed together. However, batteries having a higher energy storage density, for example, lithium-ion batteries, are explosion prone.

SUMMARY OF DISCLOSURE

A power supply apparatus comprising a main housing, a battery assembly, battery management circuitry and temperature conditioning arrangement is disclosed.

The battery assembly comprises a plurality of batteries, the batteries having safety vents which are distributed on a first surface of the battery assembly for releasing gaseous discharge.

The main housing comprises a battery compartment in which the battery assembly is held. The battery compartment comprises a discharge chamber which is in fluid communication with the safety vents. The venting aperture or a plurality of venting apertures is formed on the discharge chamber, and wherein a thermal sensor or a plurality of thermal sensors is provided on the discharge chamber. The thermal sensor is configured to detect temperature inside the battery compartment and to deliver temperature information to the battery management circuitry. The battery management circuitry is configured to activate a counter-measure or temperature conditioning arrangement to condition temperature of the battery assembly when the temperature detected by the thermal sensor or the plurality of thermal sensors reaches an activation threshold temperature.

The batteries may be interconnected by inter-battery-group connectors to form a plurality of serially connected battery groups each comprising a plurality of batteries in parallel connection. For example, two adjacent battery groups are interconnected by an inter-battery-group connector and each inter-battery-group connector comprises a plurality of inter-battery connectors in series. For example, three adjacent battery groups are interconnected by two inter-battery-group connectors.

The battery assembly may comprise a heat transfer network which is in thermal and electrical connection with battery terminals of the battery assembly and a thermal exchange device which is in thermal connection with the heat transfer network but which is electrically insulated from the heat transfer network.

The thermal exchange arrangement is configured to facilitate exchange of heat across the battery compartment. For example, the thermal exchange device may partition the main housing into a battery compartment, and thermal exchange may be performed across a boundary or across a partition panel of the thermal exchange device which partitions the main housing into the battery compartment.

The thermal exchange device comprises a thermal contact surface which is in thermal contact with a heat transfer network and a thermal exchange surface which is configured to perform the exchange of heat. The plurality of inter-battery connectors or inter-battery group connectors cooperate to form the heat transfer network.

The inter-battery connectors and the inter-battery group connectors are in physical and thermal contact with the thermal contact surface of the thermal exchange device to facilitate transfer of heat from the battery terminals to the thermal contact surface and is electrically insulated from the thermal exchange surface or the thermal exchange device.

The inter-battery group connectors are formed as metal gratings to make heat transfer more effective and efficient.

DESCRIPTION OF FIGURES

The present disclosure is described by way of example and with reference to the accompanying figures, in which.

DETAILED DESCRIPTION

Figure 1A:
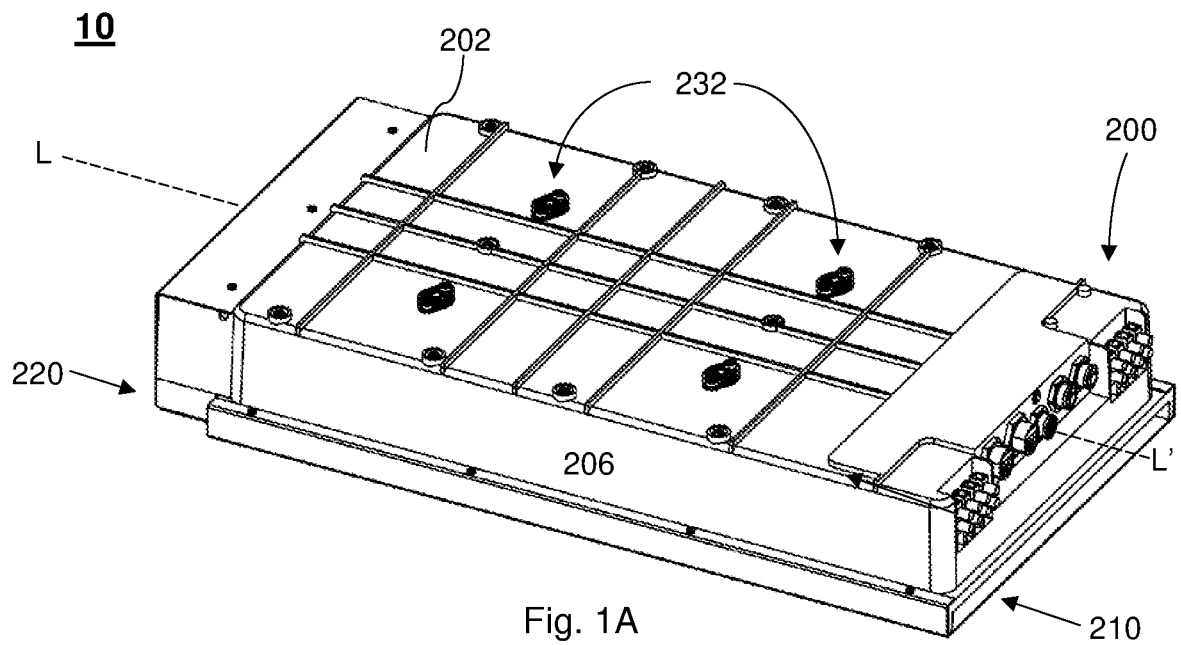
FIGS. 1A and 1B are perspective views of an example power supply apparatus according to the present disclosure.
Figure 1B:
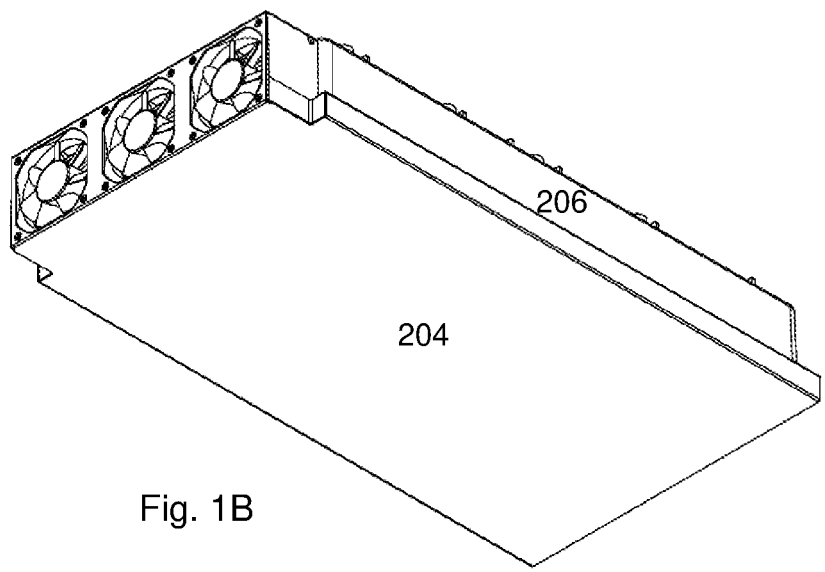
Figure 1C:
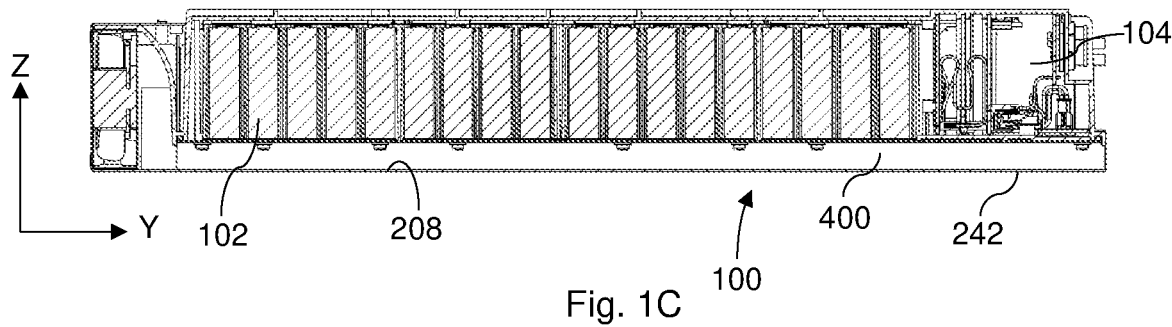
FIG. 1C is a longitudinal cross-sectional view of the power supply apparatus of FIG. 1A taken along the main longitudinal axis L-L'.

An example power supply apparatus 10 of the present disclosure comprises a battery assembly 100, management circuitry and a main housing 200 inside which the battery assembly 100 and the management circuitry 300 are received, as depicted in FIGS. 1A, 1B, 1C, 1D, 2, 2A, 2B, 3A, 3B, 3C, 4A, 4B, 4C, 4D, 4E, 5 and 5A. The battery assembly 100 comprises a plurality of batteries 102 which are usually rechargeable batteries organized into a plurality of battery groups.

Figure 1D:
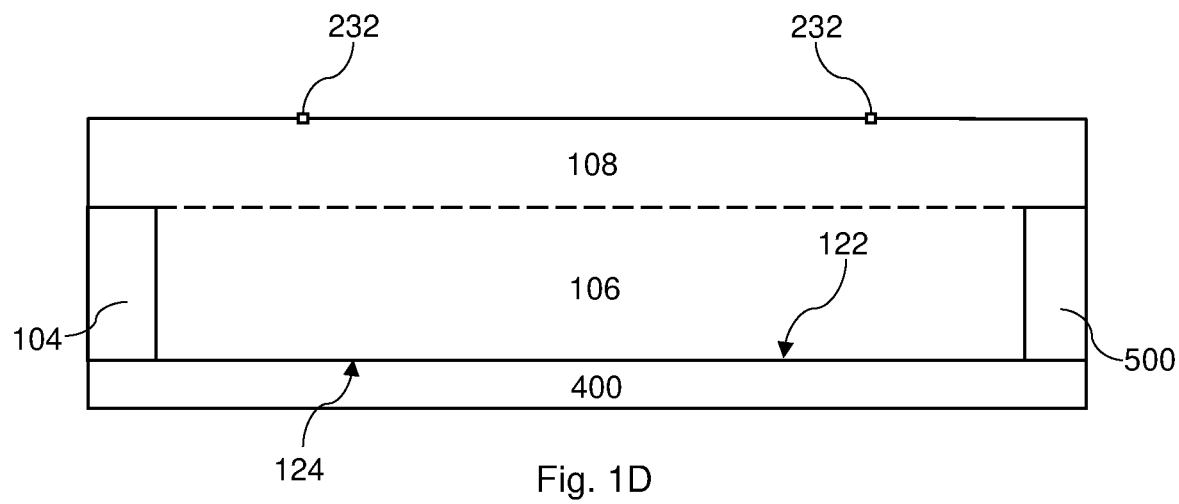
FIG. 1D is a schematic diagram showing example compartmental layout of the power supply apparatus.
Figure 2A:
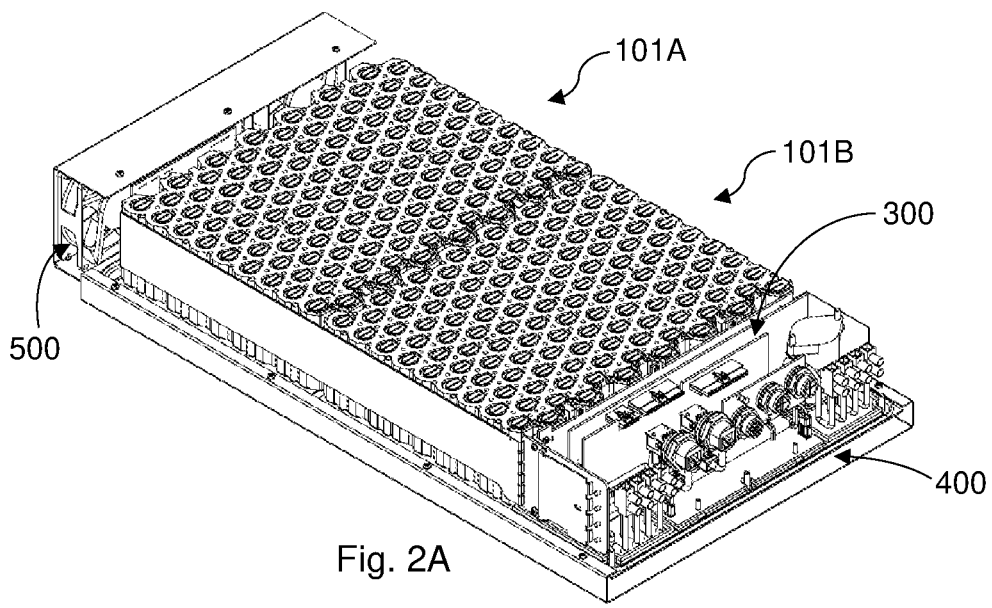
FIG. 2A is a perspective view of the power supply apparatus exposing the battery assembly.
Figure 2B:
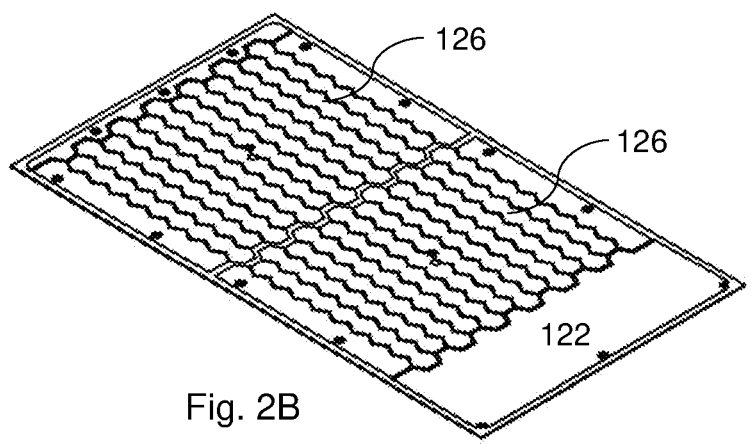
FIG. 2B is a perspective view of an example base plate showing heat conductive tracks.
Figure 2:
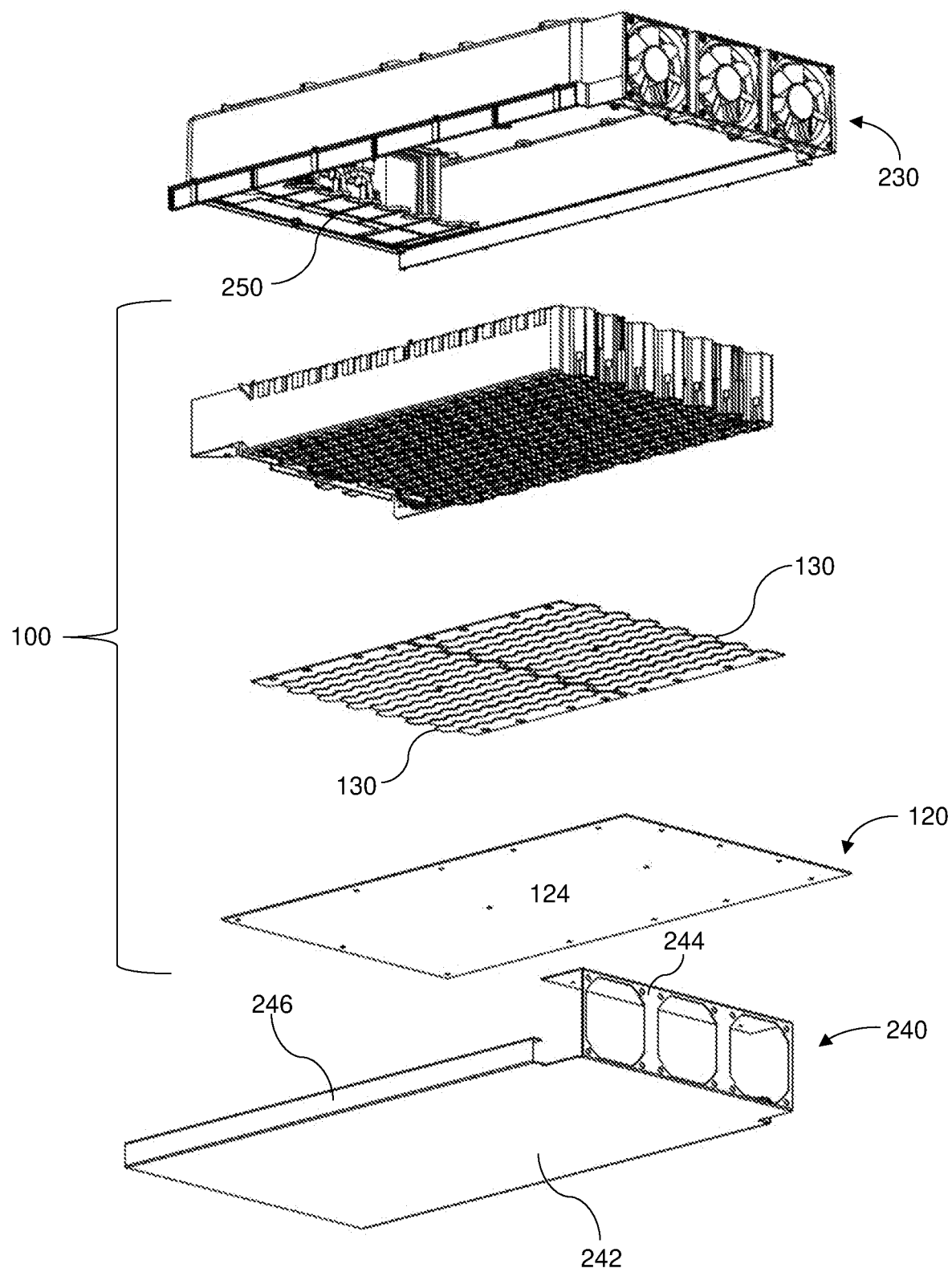
FIG. 2 is an exploded view showing example major components of the power supply apparatus of FIG. 1A.
Figure 3A:
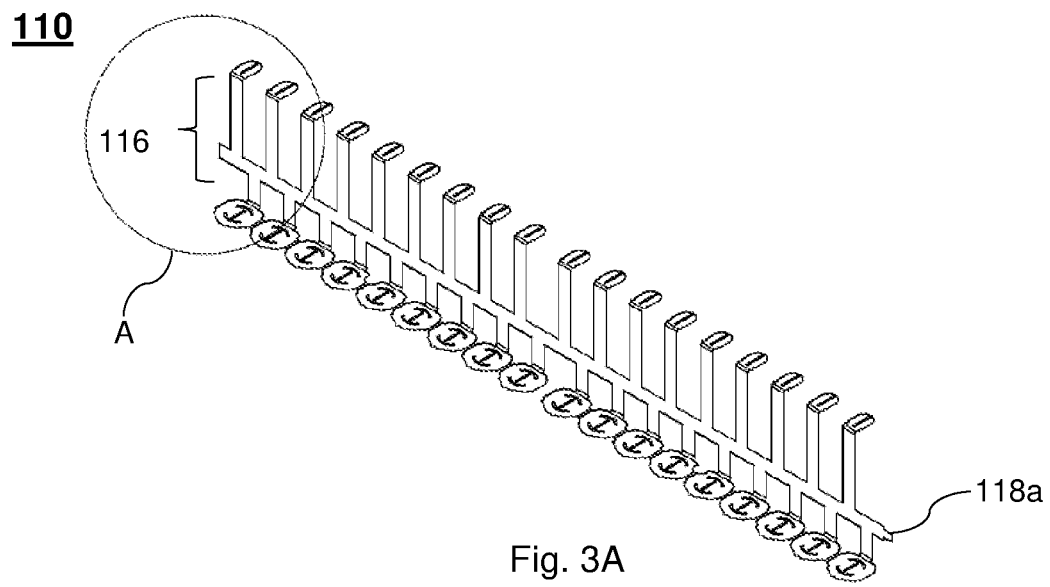
FIGS. 3A and 3B are, respectively, perspective and front views of an example inter-battery-row connector comprising an array of example inter-battery connectors.
Figure 3B:
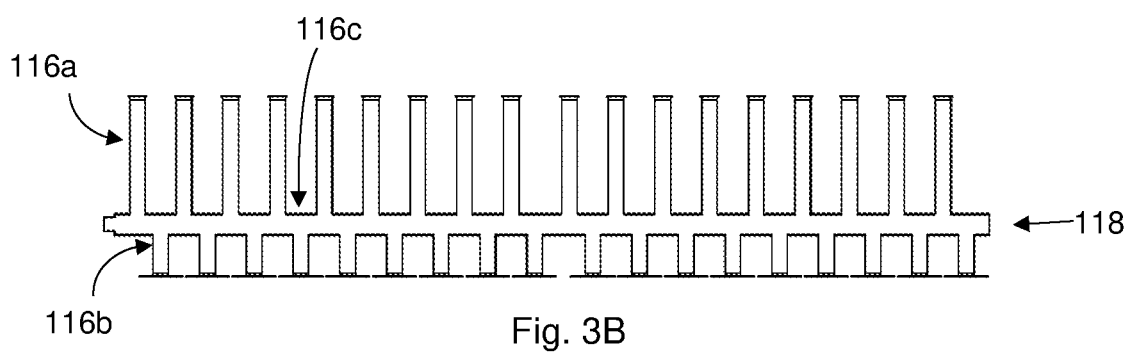
Figure 3C:
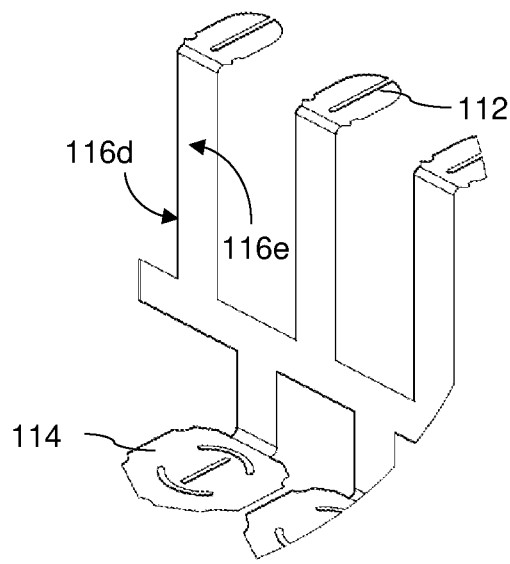
FIG. 3C is an enlarged view of the circled portion (A) of the inter-battery row connector of FIG. 3A, FIGS. 4A and 4B are perspective views of an example battery tray of the power supply apparatus.
Figure 4A:
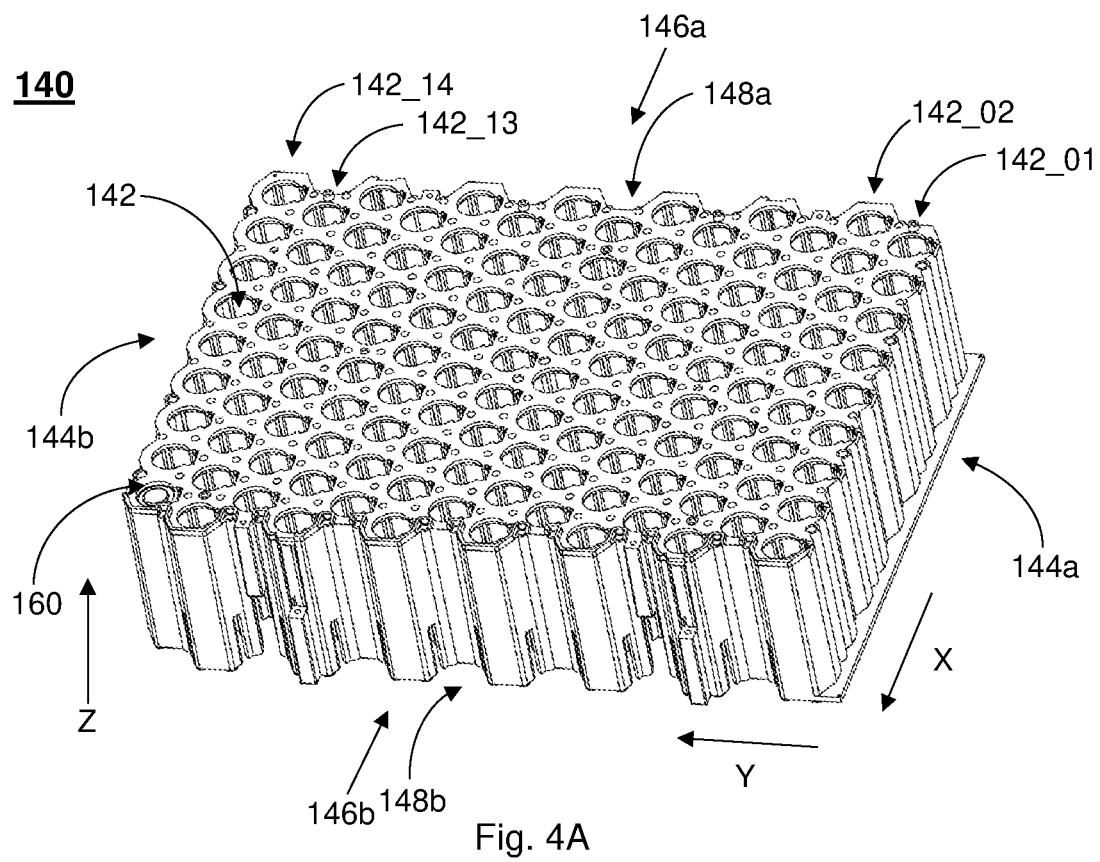
FIG. 4C is a plan view of the battery tray of FIG. 4A, FIGS. 4D and 4E are enlarged views of the circled portions (B, C) of the battery tray.
Figure 4B:
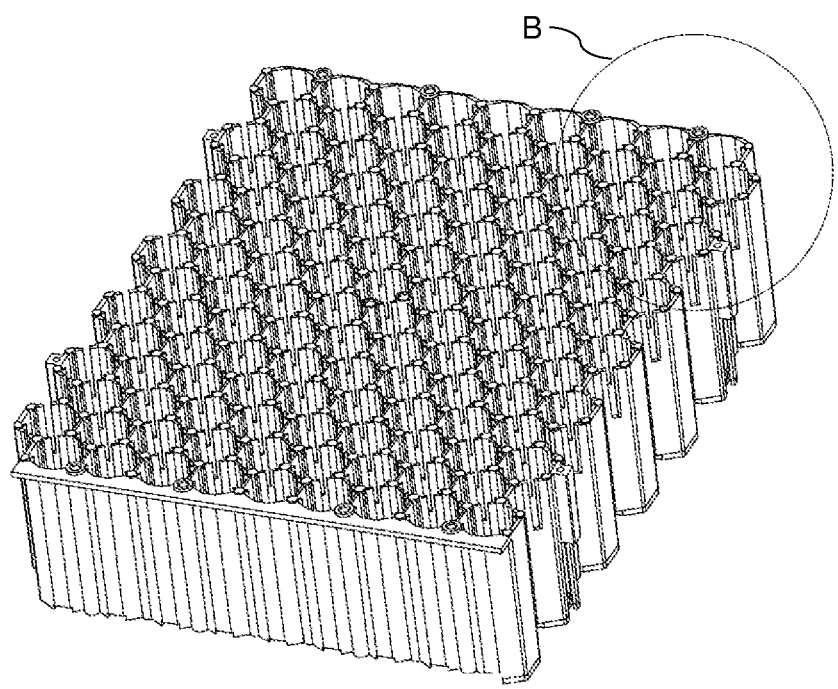
Figure 4C:
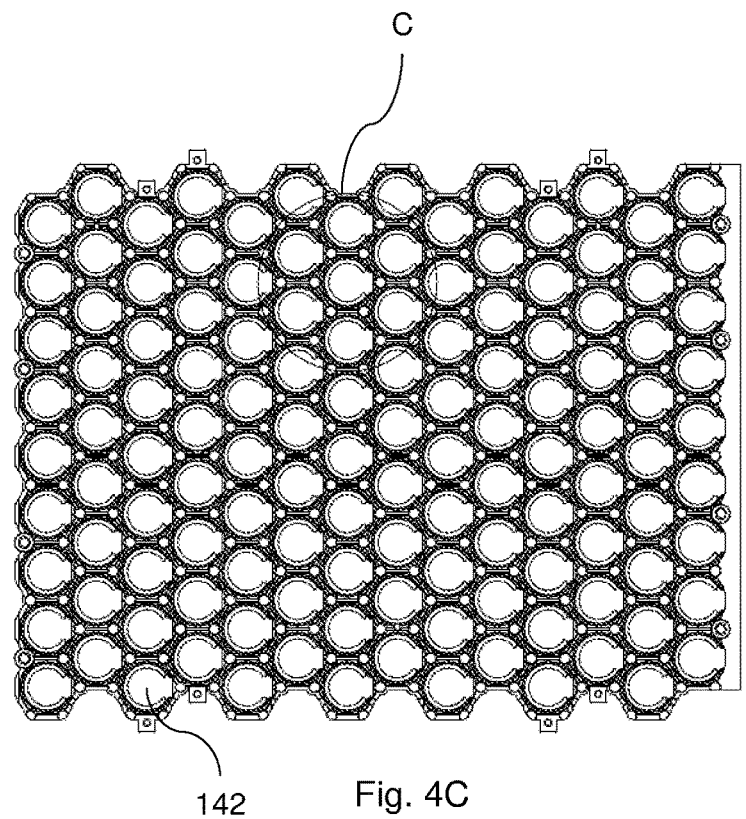
Figure 4D:
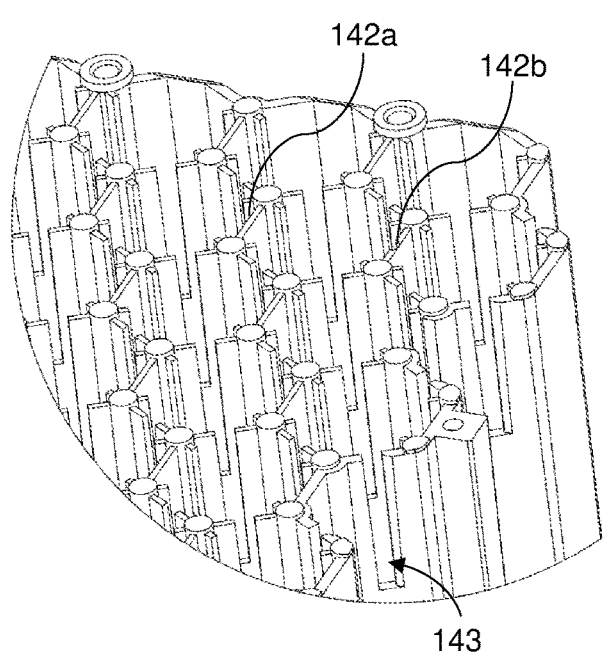
Figure 4E:
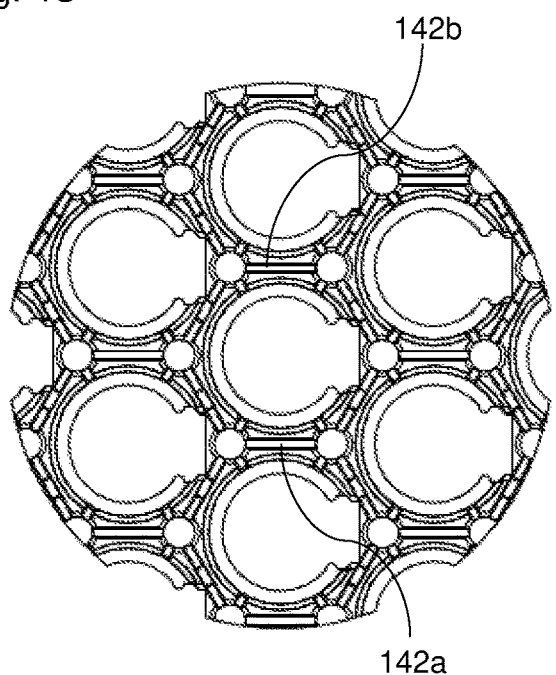

The main housing 200 comprises a plurality of compartments, for example, a main compartment and a fan compartment, as depicted in FIG. 1D. The main compartment is partitioned into a battery compartment 106 inside which the battery assembly 100 is received, a circuitry compartment 104 in which the management circuitry is received, an air compartment 400, and functional compartments which may be useful or beneficial. The fan compartment 500 is formed at a longitudinal end of the main housing 200 and an air-moving arrangement is installed inside the fan compartment.

The main housing 200 may be formed from metal parts, parts of strong plastics or a combination of both metal and strong plastic parts. The main housing may comprise a plurality of housing portions. For example, the main housing may comprise a main compartment housing portion and a fan compartment housing portion. The main compartment housing may be partitioned into a plurality of functional compartments.

The main housing comprises a first main housing portion ("first portion" in short), a second main housing portion ("second portion" in short), and a peripheral main housing portion ("peripheral portion" in short) interconnecting the first portion and the second portion. The first portion is on a first axial end and has an inward-facing major surface ("first major surface"). The second portion is on a second axial end and has an inward-facing major surface ("second major surface") which has a facing orientation directly opposite to that of the first major surface. The example main housing 200 comprises a top portion 202 as an example first portion, a bottom portion 204 as an example second portion and a peripheral portion 206 interconnecting the top portion and the bottom portion which cooperate to define the main compartment housing. The peripheral portion extends in an axial direction Z between the bottom portion and the top portion to surround and define the main compartment. The peripheral portion has a first end which is a first longitudinal end 210 in this example and a second which is a second longitudinal end 220 in this example. The first longitudinal end 210 and the second longitudinal end 220 respectively defines a first longitudinal end and a second longitudinal end of the main compartment.

The first longitudinal end 210 and the second longitudinal end 220 are opposite longitudinal ends of the main housing 200 are on a main longitudinal axis L-L' of the main housing, which is also the longitudinal axis of the main compartment and which defines a main longitudinal direction Y of the apparatus. The axial direction Z of the peripheral portion defines a main axial direction of the apparatus which is orthogonal to the main longitudinal direction L.

The fan compartment housing portion is a longitudinal housing portion which projects away from the main compartment and extends in the main longitudinal direction of the main longitudinal axis L-L' to define the fan compartment.

The circuitry compartment is on a first longitudinal end 210 of the main housing, the fan compartment is on a second longitudinal end 220 of the main housing, and the battery compartment is intermediate the circuitry compartment and the fan compartment.

A plurality of peripheral devices is disposed on a front panel on the first longitudinal end 210 of the main housing. The peripheral devices may comprise input, output and control interfaces including a power input, a power output, data interfaces, and user-interfaces.

The apparatus is configured as a power supply module such that the power supply module may operate as a standalone power supply or as a modular component of a plurality of power supply module forming a larger scale power supply.

The management circuitry comprises battery management circuitry and peripheral circuitry. The battery management circuitry may comprise battery charging control circuitry, battery discharge control circuitry, battery conditions monitoring circuitry, battery safety control circuitry, and/or other useful circuitries. The peripheral circuitry may comprise metering circuitry, telecommunication circuitry including a data communication frontend, switching control circuitry, remote sensing circuitry, and other useful circuitries.

The example main housing 200 comprises a first main housing portion and a second main housing portion which cooperate to form the main housing. The example first main housing portion is an upper housing portion 230 which comprises the top portion and the peripheral portion, and the example second main housing portion is a lower housing portion 240 which comprises the bottom portion.

In example embodiments such as the present, the upper housing portion 230 is shaped and configured to define a battery compartment and is formed of a thermally insulating material, such as hard engineering plastics. The example upper housing portion is integrally formed form a strong engineering plastic material such as ABS and the battery compartment is a closed compartment except where venting apertures 232 are provided. In some embodiments, the upper housing portion may be of a thermally conductive material, for example, steel, aluminum or other metal. The upper housing comprises peripheral flanges which are complementary to peripheral flanges on the lower housing portion to facilitate quick assembly.

The example lower housing portion 240 is formed as a metal casing portion. The metal casing portion comprises a metal plate portion 242, a fan panel 244 on a longitudinal end, and peripheral flanges 246 extending along its sides. The metal plate portion defines the bottom portion of the main housing as well as the floor 208 of the main housing. The fan panel extends orthogonally to the metal plate portion and defines a plurality of fan apertures which is aligned with fans mounted on fan-mounting frame formed on the upper housing portion to permit through passage of air through the fans mounted in the fan compartment.

The portion of the metal casing portion 242 which forms the bottom portion of the main housing is a stainless-steel plate which cooperates with the upper housing portion 230 to form the main compartment and the fan compartment which is adjacent to and in fluid communication with the air compartment.

The battery assembly 100 is mounted on the main housing and held between the top portion of the main housing and the air compartment.

The battery assembly 100 comprises a plurality of batteries which are electrically interconnected. Batteries of the battery assembly may be interconnected to form a plurality of parallel connected batteries and/or a plurality of serially connected batteries. The battery assembly may be arranged into one battery ensemble or a plurality of battery ensembles, and each battery ensemble is referred to as a battery group. A battery ensemble may comprise a plurality of batteries in parallel connection and/or a plurality of batteries in serial connection. The batteries of the battery assembly are electrically interconnected by a plurality of inter-battery connectors. A plurality of inter-battery connectors may be connected in series to form an inter-ensemble connector to connect an adjacent pair of battery ensembles.

The battery assembly may be arranged into one battery module or a plurality of battery modules. Each battery module comprises a plurality of parallel connected battery groups and/or a plurality of serially connected battery groups.

An example battery module comprises a first module portion having a first module surface which defines a first module end and a second module portion having a second module surface which defines a second module end. The example battery module has a top portion as an example first module portion and a top surface as an example first module surface which defines a top end as an example first end of the battery module. The example battery module has a bottom portion as an example second module surface and a bottom surface as an example second module surface which defines a bottom end of the battery module, and a peripheral portion which extends in an axial direction between the top end and the bottom end. The top end and the bottom end are opposite axial ends of the battery module. The axial direction of the example battery module is parallel to the battery axes of the batteries of the battery module. The axial direction of the example battery module is parallel to the main axial direction of the example main housing, but may be at an angle or may be orthogonal to the main axial direction of the main housing in some embodiments.

An example battery module comprises a plurality of first battery terminal contact tabs 112 which are distributed on the first portion of the battery module to form an exposed first module surface and a corresponding plurality of second battery terminal contact tabs 114 which are distributed on the second portion of the battery module to form an exposed second module surface. A first battery terminal contact tabs is physically connected to a first battery terminal of a battery, for example by spot or laser welding. The first battery terminal of a battery has a first electrical polarity and a safety vent which is formed at or near the first battery terminal. The first battery terminal contact tab 112 has a slit or an aperture and is exposed to a discharge chamber which is intermediate the battery module and the first portion of the main housing. The battery is held so that its safety vent is proximal to the first module surface and is unblocked by the first module surface so that hot gaseous discharge emanating from the battery can move freely from the first battery terminal to the first module surface and subsequently to the venting apertures 232 on the main housing. The safety vent of conventional batteries is typically formed proximal to the positive terminal of the battery in which case the first battery terminal is a positive terminal of a battery and the second battery terminal is a negative terminal of a battery. Where the safety vent is proximal the negative battery terminal, the first battery terminal will be the negative terminal and the second battery terminal will be the positive terminal without loss of generality.

A second battery terminal contact tab 114 is physically connected to a second battery terminal of a battery, for example by spot or laser welding. The second battery terminal has a second electrical polarity which is opposite to the first electrical polarity. Where the first battery terminal is a positive terminal, the second battery terminal is a negative terminal and vice versa, The second module surface is an exposed module surface to facilitate physical and thermal connection with a thermal exchange device.

The peripheral portion of the battery module comprises a peripheral wall which surrounds the batteries of the battery module. The peripheral wall comprises a peripheral surface which extends in the axial direction to define the first portion and the second portion of the battery module.

The battery module is mounted on the main housing such that its first surface is proximal to the first portion and distal from the second portion of the main housing and such that its second surface is proximal to the second portion and distal from the first portion of the main housing. The example battery module is mounted on the example main housing such that its top surface is proximal to the top portion of and distal from the bottom portion of the main housing and such that its bottom surface is proximal to the bottom portion and distal from the top portion of the main housing.

The battery module is maintained at an axial level with respect to the first surface of the main housing so that an axial separation is maintained between the first surface of the battery module and the first surface of the main housing. This axial separation defines a discharge chamber so that gaseous discharge emanating from batteries of the battery module can exit from the apparatus through venting apertures 232 on the first surface of the main housing after travelling through the discharge chamber. This axial separation is selected to be relatively small to facilitate effective monitoring of extreme battery conditions. The axial separation distance may be approximately between 0.2 cm and 2 cm for the example battery arrangement, which is between 3% and 30% of the axial extent of a battery module of 18650 batteries. In general, the axial extent is selected to be at or larger than 3%, 5%, 7%, 9%, 11% and smaller than 20%, 25%, 30% of the axial extent of the battery module as a rule of thumb.

The venting apertures are in fluid communication with the discharge chamber and the number of venting apertures is significantly smaller than the number of batteries of the battery assembly. The example battery assembly has over 250 batteries but only four venting apertures. Each venting aperture is equipped with a thermal sensor and the thermal sensors are connected to temperature monitoring circuits of the battery management circuitry for monitoring temperatures of gaseous discharges of the battery assembly. In order that the temperature of hot gaseous discharge emanated from the batteries of the battery assembly does not drop significantly before reaching the thermal sensors, the discharge chamber, or more particularly the top portion of the main housing is thermally insulated from the ambient to facilitate correct temperature monitoring. In this example, the first module surface is proximal to and directly facing the ceiling of the man housing, a plurality of venting apertures is distributed on the top portion of the main housing, and the battery module is maintained at an axial level below the ceiling of the main housing so that an axial separation is maintained between the top surface of the battery module and the ceiling of the main housing. In some embodiments, the first module surface is proximal to and directly facing the floor of the man housing, a plurality of venting apertures is distributed on the bottom portion of the main housing, and the battery module is maintained at an axial level above the floor of the main housing so that an axial separation is maintained between the bottom surface of the battery module and the floor of the main housing. Terms such as upper and lower, top and bottom, above and below are used for ease of reference with reference to how the apparatus is configured during use and is not meant to be restrictive. For example, the apparatus may be configured such that the battery axes which define the module axis are horizontal or at an angle to the vertical and the terms upper and lower, top and bottom, above and below should be construed accordingly and mutatis mutandis without loss of generality.

The example battery assembly comprises an example plurality of two battery modules 101A, 101B which are mounted side-by-side and in abutment for maximal compactness. The battery modules may be mounted spaced apart where compactness is not required. The example battery modules are mounted such that top surfaces of the component battery modules are aligned on the same axial level and facing the ceiling of the main housing, the bottom surfaces of the battery modules are aligned on the same axial level and facing the bottom portion of the main housing, and the peripheral portions are laterally aligned so that the battery assembly has a generally rectangular outline.

The battery assembly 100 comprises a base plate 120 which is mounted to the bottom ends of the battery modules (or mounted to the bottom end of the battery module where the battery assembly has a single battery module) to form a bottom end of the battery module. The base plate 120 partitions a portion of the main housing into an upper portion which defines the battery compartment and a lower portion which defines the air compartment. The base plate is fastened onto a peripheral flange of the main housing to form a substantially air-tight battery compartment except at the venting apertures. The peripheral flange extends along the inner peripheral of the main housing and projects inwardly to form a sealing flange so that when in cooperation with the base plate and fasteners distributed along the peripheral flange forms a substantially air-tight battery compartment. The base plate is in physical and thermal contact with battery terminal tabs on the bottom end of the battery module but is electrically insulated from the battery terminal tabs.

The battery assembly is mounted on the main housing and is maintained at an axial level above the floor of the main housing. The floor of the main housing is an inward-facing surface on the bottom portion of the main housing.

The axial elevation of the battery assembly above the floor of the main housing defines the axial extent of the air compartment. The axial extent of the air compartment is larger than the axial extent of the discharge chamber, for example, by 25%, 30%, 35%, 40%, or more.

The base plate 120 forms a bottom end of the battery module and has a major surface which faces away from the battery module and forms a bottom surface of the battery assembly. The air compartment is defined between the bottom surface of the base plate and the floor of the main housing.

The battery assembly 100 comprises a thermal exchange arrangement which is to facilitate thermal exchange between the battery assembly and air inside the air compartment or ambient air. The thermal exchange arrangement comprises a thermal exchange device which is in thermal connection with the battery modules and which has a thermal exchange surface which is thermally exposed to the air compartment or the ambient air in embodiments where the main housing has no air compartment so that heat exchange is with ambient air.

The example thermal exchange device of the present example comprises a thermally conductive plate having a thermal contact surface 122 that is thermally connected to the battery terminals of the battery assembly by means of a heat transfer network and which has a thermal exchange surface 124 which is exposed to air, for example air inside the air compartment or ambient air where there is no air compartment. The thermal contact surface and the thermal exchange surface are opposite-facing major surfaces of the thermally conductive plate.

The base plate 120 of the example battery assembly is a thermally conductive plate which is to function as a thermal exchange device in this example. To establish efficient thermal connection between the battery terminals and the base plate, the battery contact tabs exposed on the bottom portion of the battery modules are joined to an upper surface of the base plate by an electrically insulating thermal conductive medium such as a thermal conductive glue or preferably elastomeric thermal conductive sheets or thermal conductive strips 130 so that the base plate and the battery contact tabs are maintained in thermal connection but in electrical isolation from each other. For operations where the thermal exchange arrangement is to prevent overheating of batteries of the battery assembly, the upper surface of the base plate is for collecting heat from the batteries of the battery assembly and is therefore a heat collection surface while the lower surface of the base plate is a heat discharge surface for dissipating heat into the air compartment. For operations where the thermal exchange arrangement is to warm up the batteries of the battery assembly to their operation temperature range, the operation reverses such that the lower surface of the base plate becomes a heat collection surface to collect heat from the air compartment and the upper surface of the base plate becomes a heat discharge surface for dissipating heat into the batteries.

The air compartment is an air chamber which is in fluid communication with the fan compartment on one longitudinal end and in fluid communication with ambient air on another longitudinal end which is distal to the fan compartment. So that ambient air can be freely drawn into the air compartment for thermal exchange, the circuitry compartment has a lower surface 250 which is substantial flush with the base plate to form a through air-passageway between the first longitudinal end of the main housing and the entrance to the air compartment.

In example embodiments such as the present, the base plate 120 is physically and thermally connected to battery contact tabs on the bottom surface of the battery module to ensure good thermal contact and good thermal connection between the battery module and the base plate. The example base plate 120 is a metal plate having a plurality of contact tracks 126. The contact tracks are an integral part of the metal plate and adjacent contact tracks are isolated and insulated. Each track is thermally connected to a row of batteries by means of a corresponding shaped thermal connector strip 130. An example base plate is formed from a composite base board having a composite structure similar to the structure of a composite board for forming a printed circuit board, except that the base board has an insulted layer formed on a metal substrate rather than a metal layer formed on an insulator substrate. The example base plate has an aluminum plate substrate and an electrical insulating coating on the plate substrate. The contact tracks may be formed by masked imprinting and etching so that the contact tracks remain and appear as printed metal tracks on a metal substrate after masked removal of the insulating layer on top. The thermal contact tracks are mutually isolated and mutually insulated tracks. Adjacent contact tracks are separated by and/or surrounded by insulating tracks which form insulating gaps. Each track is elongate and has a zig-zag profile on each of its long edges to follow the zig-zag outline of battery compartments forming a battery receptacle row. The example zig-zag profiles on the long sides of an example contact track are symmetrical about a longitudinal axis of the contact track, which is also a center axis of the contact track. The base plate is to function as a heat sink to sink heat which is built-up or developed in the battery assembly and to function as a heat dissipator to dissipate heat into the air compartment. To enhance heat dissipation rates, heat dissipating protrusions, such as fins or distributed protrusions may be formed on the underside of the base plate. The underside of the base plate is a thermal exchange surface of the base plate which is exposed to the air compartment and which is in thermal contact with air inside the air compartment or ambient air. The thermal exchange surface is to function as a heat dissipation surface when arrange to dissipate heat from the battery compartment.

The metal plate which forms the bottom portion of the main housing further helps to enhance heat dissipation rate.

The example thermal connector strip may be an elastomeric thermal connector, for example, an elastomeric thermal connector made of a non-silicone thermal interface material. products of the F-CO™ series available from Furukawa are an example of thermal conductive medium suitable for this purpose.

In the present example, battery contact tabs forming the top surface of the battery assembly are contact tabs which are physically joined to positive battery terminals of batteries of the battery assembly, and battery contact tabs forming the bottom surface of the battery assembly are contact tabs which are physically joined to negative battery terminals of batteries of the battery assembly. The battery contact tabs may be physically joined by spot welding, laser welding or other metal joining techniques.

The base plate is thermally mounted to the negative battery terminals through battery contact tabs on the bottom surface of the battery module to take advantage of the larger end surface area of a negative battery terminal of a cylindrical battery (compared to the end surface area of a positive battery terminal) to enhance better thermal dissipation from the batteries to the base plate, which is to function as a heat sink or heat dissipating surface in the example embodiment.

In the example apparatus, the top and peripheral portions of the main housing cooperate with the base plate to define the battery compartment, and the bottom portion of the main housing cooperate with the base plate to define the air compartment. The battery compartment is a closed compartment having the venting apertures as the only air outlets so gaseous discharge from the battery assembly can only exit from the venting apertures which are on the top portion of the main housing. The air compartment is preferably a closed chamber having an air inlet on one longitudinal end and an air outlet on the other longitudinal end so that ambient air drawn into the air compartment has to travel along the entire span of the air compartment for good thermal exchange.

An array of electrical fans is mounted on the fan compartment housing to form an example air-moving arrangement. The array of fans extends transversely to the longitudinal axis and comprises an example plurality of three axial fans and the fan axes are parallel to the longitudinal axis of the main housing. The fans are arranged to move air out of the air compartment through the axial fans and to draw ambient air into the air compartment. In example embodiments, ambient air inlets are formed on a longitudinal end of the main housing which is distal to the fan compartment so that incoming ambient will traverse the entire length of the base plate before reaching the fan compartment to exit. In some embodiments, ambient air inlets may be formed on sides of the main housing which defines the air compartment.

During operations of the air-moving arrangement, air inside the fan compartment is drawn out of the fan compartment and exits from the apparatus through the fans. As a result, a low-pressure region is formed inside the fan compartment, and air inside the air compartment will be drawn into the fan compartment due to pressure differences. As a result of movement of air from the air compartment into the fan compartment, a low-pressure region is formed inside the air compartment and ambient air will be drawn from outside of the apparatus into the air compartment to replenish the loss of air from the air compartment.

The contact between the base plate and air inside the air compartment will result in thermal exchange between the base plate and air in the air compartment, and movement of air across the air compartment to the ambient will result in transport of heat resident in the air of the air compartment to outside of the apparatus.

When heat carrying air is moved across the air compartment and subsequently moved out of the apparatus, the air compartment will be replenished with newly drawn air of a lower temperature, for example, at ambient air temperature, and continuation operation of the heat exchange and removal process by operation of the air-moving arrangement will hopefully cool down the battery assembly rapidly to prevent adverse and contagious heat built-up inside the battery assembly and prevent catastrophic battery meltdown.

The thermal exchange device is configured to collect heat from batteries, and more specifically from interior of batteries, of the battery assembly. To facilitate collection of heat from interior of the batteries, a heat collection and transfer network (heat transfer network in short) which thermally interconnects the electrodes of the batteries and the thermal exchange device is provided. The example heat transfer network comprises heat collection terminals which are integrally connected to the first battery terminals of the batteries. Since the first battery terminal of a battery is always a good conductor of both heat and electricity which is directly or integrally joined with a battery electrode to minimize resistance, a heat transfer network having heat collection terminals which are in good thermal connection with the battery terminals would facilitate efficient and rapid extraction of heat from the interior of the batteries for dissipation to the ambient when the heat transfer network is thermally connected to the ambient, for example, by means of a thermal exchange arrangement.

The example heat transfer network comprises a plurality of inter-battery connectors of the battery assembly. An example inter-battery connector comprises a first battery terminal contact tab 112 ("first contact tab" in short), a second battery terminal contact tab 114 ("second contact tab" in short) and an inter-terminal tab 116 which interconnects the first contact tab and the second contact tab. The first contact tab is for connection to a first terminal of a battery, the second contact tab is for connection to a second terminal of another battery which is in adjacency, and the inter-terminal tab is an inter-battery link which interconnects a pair of adjacent batteries.

An example inter-battery link comprises a first link portion 116a, a second link portion 116b and an intermediate link portion 116c interconnecting the first link portion and the second link portion. Each link portion is a tab portion having geometry of a tap. A tab has a major surface 116d which is a flap surface, and the major surface of a tab has an area which is significantly larger than (for example, 5 times, 10 times, 15 times, 20 times or more as a convenient example) the area of its minor surface 116e. The terms tab and flap have same technical meaning herein and are interchangeably used.

The first link portion comprises a first metal flap portion which integrally interconnects the first contact tab and the intermediate metal flap portion, and the first contact tab projects away from the first metal flap portion in a first projection direction. The second link portion comprises a second metal flap portion which integrally interconnects the second contact tab and the intermediate metal flap portion, and the second contact tab projects away from the second metal flap portion in a second projection direction which is opposite to the first projection direction. The first contact tab and the second contact tab are parallel and are separated by an axial separation distance equal to the axial height of one of the batteries being connected. The first metal flap portion and the intermediate metal flap portion are integrally joined and have major flap surfaces which are coplanar. The second metal flap portion and the intermediate metal flap portion are integrally joined and have major flap surfaces which are coplanar. Portions are integrally joined or integrally connected if they are joined together by fusion welding or if there formed from a single piece of material as a convenient example.

In example embodiments such as the present, batteries of a battery module or a battery assembly are organized into a plurality of battery groups and an adjacent pair of battery groups is interconnected in series by inter-battery-group connector ("intergroup connector" in short).

In example embodiments such as the present, a battery module comprises a plurality of battery groups arranged into a plurality of battery rows. Each battery row comprises a plurality of batteries in parallel connection and the battery rows are connected in series.

A battery row and an adjacent battery row which form a pair of battery rows of the battery module are interconnected by an inter-battery-row connector 110 ("inter-row connector" in short). The inter-row connector comprises an array of inter-battery connectors and the inter-battery connectors forming the array are distributed in a row direction to form a series of inter-battery connectors.

The inter-row connector comprises an array of first contact tabs, an array of second contact tabs and an array of inter-terminal tabs. The first contact tabs which form an array of first contact tabs are distributed along the row direction and adjacent first contact tabs are separated by an air gap. The second contact tabs which form an array of second contact tabs are distributed along the row direction and adjacent second contact tabs are separated by an air gap. The inter-terminal tabs forming the array of inter-terminal tabs are interconnected at their intermediate link portions to form an inter-terminal link which interconnects the array of first contact tabs and the array of second contact tabs and an array of inter-terminal tabs. The first tabs and the second tabs project in opposite projection directions and has contact surfaces which are orthogonal to the row direction.

The inter-row connector comprises a plurality of first metal flap portions which are distributed along a row direction to form a row of first metal flap portions, a plurality of second metal flap portions which are distributed along the row direction to form a row of second metal flap portions, and a plurality of intermediate metal flap portions which are distributed along the row direction to form a row of intermediate metal flap portions. The first metal flap portion and the second metal flap portion are respectively the first link portion and the second link portion in this example.

The first metal flap portions of an example inter-row connector are distributed along the row direction to form a plurality of metal flaps which extends orthogonally to the row direction between the intermediate metal flap portions and the first contact tabs.

The second metal flap portions of the example inter-row connector are distributed along the row direction to form a plurality of metal flaps which extends orthogonally to the row direction between the intermediate metal flap portions and the second contact tabs.

The first metal flap portions and the second metal flaps are alternately disposed in the row direction so that a first metal flap portion is intermediate a pair of adjacent second metal flap portions and a second metal flap portion is intermediate a pair of adjacent first metal flap portions.

Adjacent first metal flap portions of an inter-row connector are separated by an interdigital separation distance and the interdigital separation distance between immediately adjacent first metal flap portions of an interrow connector are uniform wherein the width of the first metal flap portion is uniform. The interdigital separation distance of the first metal flap portions of an inter-row connector is dependent on the width of the second metal flap portions and may be comparable to or larger than the dimension of the battery in the row direction.

Adjacent second metal flap portions of an inter-row connector are separated by an interdigital separation distance and the interdigital separation distance between immediately adjacent second metal flap portions of an inter-row connector are dependent on the separation distance of adjacent batteries and are uniform wherein the width of the second metal flap portion is uniform. The interdigital separation distance of the second metal flap portions of an inter-row connector is dependent on the width of the second metal flap portions and may be comparable to or larger than the dimension of the battery in the row direction.

The first metal flap portions and the intermediate metal flap portions cooperate to form a first metal grating. The second metal flap portions and the intermediate metal flap portions cooperate to form a second metal grating. The first metal flap portions, the second metal flap portions and the intermediate metal flap portions cooperate to form a main metal grating. Each of the metal gratings may be flexible and may be exposed so that its major surfaces are non-thermally insulated and non-electrically insulated. The intermediate metal flap portions of an inter-row connector are integrally connected to extend along the row direction to define the dimension of the inter-row connector in the row direction.

The example inter-row connector comprises an elongate row tab 118 which is a row link extending in the row direction to interconnect the first metal flap portions and the second metal flap portions of the inter-battery connectors forming the inter-row connector.

The metal flap portions have major flap surfaces which are parallel to the row direction.

An example inter-row connector is formed from a single flexible metal sheet and comprises a plurality of flexible tab portions.

An example battery module comprises a battery tray 140 (or tray in short), a plurality of batteries 160 held on the battery tray and a plurality of inter-row connectors interconnecting the batteries. The inter-row connector is for connecting battery terminals of batteries in one receptacle row with battery terminals of batteries of an abutting adjacent receptacle row. In example embodiments, where a battery module has a plurality of M receptacle rows, there is a corresponding plurality of M inter-row connectors.

Where an adjacent pair of receptacle rows of a battery module has a plurality of N battery receptacles, the inter-row connector comprises a plurality of N inter-battery connectors which are interconnected by a row link. Each inter-battery connector comprises a first contact tab, a second contact tab and an intermediate link which interconnects the first contact tab and the second contact tab. As the first contact tab and the second contact tab are terminal contact tabs for connecting to different batteries, the intermediate link is also an inter-battery link. A contact tab herein is a battery terminal contact tab unless the context requires otherwise. An example first contact tab is for connection to a first terminal of a battery of a receptacle row and an example second contact tab is for connection to a second terminal of a corresponding battery on an adjacent receptacle row. The example first contact tab projects away from the intermediate link and extends away, for example, orthogonally away, from the adjacent receptacle row. The example second terminal projects away, for example, orthogonally away from the intermediate link and extends away from the first contact tab. The first contact tab and the second contact tab are parallel and has an axial separation equal to or comparable to the length, axial extent, or height (which is 65 mm for an 18650 sized battery) of the cylindrical battery. The example intermediate link is an elongate metal flap having major surfaces which are parallel to the row direction of the receptacle row and which are parallel to the battery axes of the corresponding batteries which the inter-battery connector connects. The metals flaps forming the intermediate link extends in an air gap between the first and second terminals of the corresponding batteries. Because the contact tabs are in physical and electrical connection with the battery terminals of the corresponding batteries, heat built up in the batteries will be transferred to the inter-row connector and then to the base plate. The inter-row connector is configured to have a high surface area to volume ratio and is made of a good thermal and electrical conductor to enhance heat transfer to the base plate and good heat dissipation. The base plate and the interrow connectors are configured to form a heat transfer network whereby heat generated by batteries of the battery module is transferred to the base plate through the inter-row connectors. The heat transfer network comprises a thermal transfer matrix comprising rows of thermal conductive flaps which are thermally joined with the base plate. The thermal conductive flaps extend in an axial direction along the length of the batteries.

To promote efficient transfer of heat from interior of batteries of the battery assembly to the base plate for subsequent dissipation into the air compartment, the second contact tab, which is permanently joined to the base plate by a heat transfer interface medium, has dimensions comparable to, equal to or slightly larger than the second terminal of the battery in contact.

The example inter-row connectors of the present disclosure are configured to have a high surface area to volume ratio to function as a good heat dissipator.

A battery tray 140 of the present disclosure comprises a plurality of battery receptacles 142 for holding a corresponding plurality of batteries, so that each battery has its own battery receptacle. The battery receptacles of a battery tray are organized into a plurality of M receptacle rows. Each receptacle row (or row in short) comprises a plurality of N battery receptacles and extends along a receptacle row axis which defines a receptacle row direction X. Each battery receptacle has a receptacle axis, which is a center axis of the battery receptacle defining an axial direction of the receptacle. The receptacle row axis of a receptacle row is formed by joining the receptacle axes of the battery receptacles of that receptacle row. The battery receptacles forming a receptacle row are distributed along the receptacle row axis of the receptacle row between a first row-end and a second row-end. The first row-end is a first lateral end on which a first end-receptacle (or first receptacle) is located and the second row-end is a second lateral end of the receptacle row on which a second end-receptacle (or last receptacle) is located.

The battery tray comprises a plurality of immediately abutting receptacle rows and the immediately abutting receptacle rows are parallel to each other. The receptacles rows forming a battery tray are distributed in a distribution direction Y. The distribution direction may be orthogonal to the receptacle row direction X, but can be an angle to the receptacle row direction. The receptacle rows may be distributed so that spacings between immediately adjacent receptacle rows, which are abutting adjacent receptacle rows, are same or uniform. The receptacle rows forming a battery tray may have same number or different numbers of battery receptacles.

The example battery tray of FIG. 4 comprises an example plurality of fourteen receptacle rows (M=14). The example plurality of receptacle rows forming the example battery tray comprises first receptacle row 142_01, last receptacle row 142_14, and an example plurality of 12 intermediate receptacle rows 142_02, . . . , 142_13, which are uniformly distributed between the first receptacle row and the last receptacle row. The first receptacle row is a first end row and the last receptacle row is a second end row of the battery tray. The first end row and the second end row cooperate to define the longitudinal ends of the battery tray in the distribution direction Y. Each receptacle row of the battery tray comprises an example plurality of nine battery receptacles (N=9). The battery receptacles in a receptacle row are identified by a number system for ease of reference. In the number system, the position number of a battery receptacle is with respect to the first end (or first row-end), so that the first receptacle is one which is on the first end, the second receptacle is one next to the first, the third receptacle is one next to the second, . . . , and the last receptacle (or the ninth receptacle in this example) is one on the second end (or second row-end).

The receptacle rows are organized such that immediately adjacent receptacle rows are parallel but laterally offset and alternate receptacle rows are laterally aligned. With this lateral offset configuration, each of the lateral boundaries of the battery tray has a zig-zag profile or a serrated profile. The serrated profile on a first lateral side 146a is formed by end walls of the first end-receptacles and the serrated profile on a second lateral side 146b is formed by end walls of the second end-receptacles. The extents of lateral offset between adjacent receptacle rows are same in this example battery tray so that each lateral boundary comprises a plurality of indentations and protuberances of uniform lateral extent. The example extent of lateral offset is approximately half-width of the lateral extent (or width) of a battery receptacle so that three consecutive adjacent receptacle rows cooperate to define a half-battery receptacle 148a on the first lateral side. Where the receptacle rows have same number of battery receptacles, three consecutive adjacent receptacle rows cooperate to define another half-battery receptacle 148b on the second lateral side. Notwithstanding the zigzag boundaries, the example battery tray has a generally rectangular shape which is cooperatively defined by the first and last receptacle rows and the lateral protrusions on the lateral boundaries.

The example battery tray is organized so that odd-numbered rows are laterally aligned with odd-numbered rows, even-numbered rows are laterally aligned with even-numbered rows, and an odd-numbered row and an even-numbered row are laterally offset with respect to each other. When receptacle rows are aligned or laterally aligned, corresponding battery receptacles on the aligned rows have their battery receptacle axes aligned in a direction parallel to the distribution direction Y. Corresponding battery receptacles herein means battery receptacles having same receptacle position numbers with respect to a row end.

The example battery tray has an even number of rows of more than two rows such that the first receptacle row and the last receptacle row are laterally off-set and the first receptacle row and the last-second receptacle row are laterally aligned. When receptacle rows are aligned, the first end-receptacles of the aligned receptacle rows have their receptacle axes on a line which is parallel to the distribution direction Y. Where the receptacle rows have same number of battery receptacle, the second end-receptacles of the receptacle rows have their receptacle axes on a line parallel to the distribution direction Y. When a battery tray has an odd number of rows of more than three rows, the first receptacle row and the last receptacle row are laterally aligned without loss of generality.

Each of the intermediate receptacle rows comprises a plurality of row passageways. Each row passageway passes through two adjacent receptacle rows and spans across all battery receptacles of the two adjacent receptacle rows to define a row-channel. The row-channel is elongate and extends in a direction parallel to the row axis. An intermediate row of the battery tray comprises a first row-channel which is on a first side of the row axis and a second row-channel which is on a second side of the row axis so that the row axis is parallel to and intermediate the first and second row-channels. The example first and second row-channels are symmetrically disposed with respect to the row axis and is equidistant from the row axis of the intermediate row. An end receptacle row (the first receptacle row, the last receptacle row) has a single row passageway which extends to pass through both the end receptacle row and an intermediate row in abutment with the end receptacle row (or end row in short).

Each passageway has an end aperture on the first row-end, and/or an end aperture on the second row-end to facilitate external electrical contact between the connector which passes through the passageway.

The example battery tray is designed for holding prismatic batteries, for example, cylindrical rechargeable batteries. The example battery receptacles are customized for holding 18650 lithium-ion rechargeable batteries, which are cylindrical rechargeable batteries widely used for operation of electrical vehicles and having a rated voltage of about 3.6 volts. An 18650 battery is a single-cell battery having a nominal diameter of 18 mm and a nominal length of 65 mm. Where a battery tray is adapted for holding a single type of batteries, the battery receptacles are designed so that the battery compartments for holding the batteries have same (including substantially same) compartment dimensions. For orderly designs, battery receptacles forming a receptacle row are uniformly distributed along the row direction so that the separation distance between adjacent receptacle axes are uniform throughout the row and have same dimensions. Since the battery receptacles form a receptacle row have same dimensions and have uniform separation distance, receptacle rows having same number of battery receptacles have same length. Where batteries of a battery assembly are single-cell batteries, the inter-battery connector is referred to as intercell connector without loss of generality.

A battery receptacle 142 (or "receptacle" in short) comprises a first axial end, a second axial end which is axially aligned with the first axial end, and an intermediate portion interconnecting the first axial end and the second axial end. The first axial end is an open end having an end aperture which is large enough for a battery terminal to expose for external contact but not large enough for a battery to leave. The second axial end is an open end having an entry aperture which is large enough for axial entry of a battery. The first axial ends of the battery receptacles define the top surface of the tray and the second ends of the battery receptacles define the bottom surface of the tray. The intermediate portion comprises a peripheral wall having an inner surface which surrounds a battery cell compartment. A plurality of spacing fins is formed on the inner surface of the peripheral wall. Each spacing fin projects from the peripheral wall and extends inwardly and the spacing fins cooperate to define an outer periphery of the battery cell compartment. The battery cell compartment, or the outer periphery of the battery cell compartment, is calculated to conform to the outline of the outer periphery of the battery so that a battery is received inside the battery cell receptacle in a closely-fitted manner or with a very small spacing between the battery and the outer periphery of the battery cell compartment. The spacing fins are distributed around the inner surface of the peripheral wall to define a cylindrical compartment and to define an air gap between the battery and the peripheral wall to facilitate heat dissipation during operation of the power supply apparatus when the battery generates heat. The battery cell compartment has a cross-sectional dimension of slightly larger than a diameter of 18 mm, say, 18.2-18.5 mm. In general, an air-gap of about or less than 0.5% on each side would suffice. The air-gap dimension is to be adapted to depend on battery size and or capacity. For an 18650 battery, the air-gap fin is selected to be approximately 1 mm, but a range of between 0.5-1.5 mm may be used.

The battery tray has a first surface (or first tray surface), a second surface (or second surface surface) and a peripheral wall (or tray peripheral wall) interconnecting the first surface and second surface. Each battery receptacle defines a battery cell compartment having a compartment axis which is parallel to or coaxial with the receptacle axis. A corresponding plurality of battery cell compartments defined by the plurality of battery receptacles of the battery tray are distributed within the peripheral wall of the battery tray. The peripheral wall has a generally rectangular outline notwithstanding having serrated sidewalls. The first tray surface is defined by the first axial ends of the battery receptacles and is, more specifically, formed by an aggregate of the first axial ends of the battery receptacles and is orthogonal to the receptacle axes of the battery receptacle. The second tray surface is defined by the second axial ends of the battery receptacles and is, more specifically, formed by an aggregate of the second axial ends of the battery receptacles and is orthogonal to the receptacle axes of the battery receptacle. The tray peripheral wall is parallel to the receptacle axes of the battery receptacle. In example embodiments, the battery tray is formed of strong engineering plastics, for example, polycarbonate or ABS to withstand expected harsh operation conditions.

A battery receptacle 142 comprises a first sidewall portion 142a, a second sidewall portion 142b, a third sidewall portion and a fourth sidewall portion which cooperate to form the peripheral wall of the intermediate portion surrounding the battery compartment.

The first sidewall portion and the second sidewall portion are opposite facing sidewall portions on the row axis of the receptacle row containing the battery receptacle and on opposite sides of the receptacle axis. The first sidewall portion defines a first lateral boundary of the battery receptacle, the second sidewall portion defines a second lateral boundary of the battery receptacle, and the first sidewall portion and the second sidewall portion cooperate to define the lateral extent (or width) of the battery receptacle. Lateral extent herein is an extent in the direction of the row axis.

Where a battery receptacle is one which is an intermediate battery receptacle in abutment with two adjacent battery receptacles of the same receptacle row, each one of the first sidewall portion and the second sidewall portion is a receptacle wall portion of the intermediate battery receptacle which is shared by the intermediate battery receptacle and one of the abutting adjacent battery receptacles of the same receptacle row. In other words, the first sidewall portion and the second sidewall portion of an intermediate battery receptacle are opposite facing receptacle sidewall portions which are shared by three consecutive battery receptacles on the receptacle row. The first sidewall portion and the second sidewall portion are also partitioning wall portions which provide partitioning among three consecutive battery receptacle compartments on the receptacle row. Where a battery receptacle is an end-receptacle, i.e., one that is on a row end, one of the first sidewall portion and second sidewall portion is shared with an abutting adjacent battery receptacle.

The third sidewall portion and the fourth sidewall portion are sidewall portions on opposite sides of the row axis and on opposite sides of the receptacle axis such that the receptacle axis of the battery receptacle and the row axis of the receptacle row containing the battery receptacle is intermediate the third sidewall portion and the fourth sidewall portion. Each one of the third sidewall portion and the fourth sidewall portion is a sidewall portion which interconnects the first sidewall portion and the second sidewall portion.

The example battery tray comprises a first tray end 144a which is a first end of the tray, a second tray end 144b which is a second end of the tray, a first tray side which is a first lateral side 146a of the tray, and a second tray side which is a second lateral side 146b of the tray. The first side wall portion 142a of a battery receptable 142 is a sidewall portion which is proximal to the first lateral side (and distal to the second lateral side) of the tray. The second side wall portion 142b of a battery receptable is a sidewall portion which is proximal to the second lateral side 146b (and distal to the first lateral side) of the tray. The third side wall portion of a battery receptable is a sidewall portion which is proximal to the first tray end 144a (and distal to the second tray end). The fourth side wall portion of a battery receptable is a sidewall portion which is proximal to the second tray end 144b (and distal to the first tray end).

The receptacle rows are distributed in parallel and in abutment between the first tray end and the second tray end, comprising a first end row, a last end row and a plurality of intermediate rows between the first end row and the last end row. The first end row is a receptacle row on the first tray end and the last end row is a receptacle row which is on the second tray end.

The battery tray has a first end wall which is a peripheral wall on the first tray end and a second end wall which is a peripheral wall on the second tray end. The first end wall is defined by sidewall portions (or more specifically the third side wall portions) of the receptacles on the first end row. The second end wall is defined by sidewall portions (or more specifically the fourth side wall portions) of the receptacles on the last end row. The first tray end comprises a flange portion which projects away from the first end wall. No flange portion is formed on the second tray end so that the first and second ends can be identified more easily. In some embodiments, a flange portion which projects away from the second end wall may be formed. The flange portion is to sit on a corresponding flange formed on the main housing when assembled.

The battery tray has a first side wall which is a peripheral wall on the first tray side and a second side wall which is a peripheral wall on the second tray side. The first side wall is formed by sidewall portions (or more specifically the first side wall portions) of the first receptacles of the receptacle rows. The second side wall is formed by sidewall portions (or more specifically the second side wall portions) of the last receptacles of the receptacle rows.

A plurality of conductor outlets is formed on the peripheral wall of the first tray side and/or the second tray side. The conductor outlet is formed as an axially extending slit portion on a side wall portion of a receptacle which defines part of the side wall of the tray. The slit portion is a continuation of a conductor passageway on a receptacle row to permit a portion, for example, a tab portion, of an inter-row connector to protrude or pass through. The number of slit portions required is equal to the number of inter-row connectors which is equal to the number of rows minus one.

Figure 5:
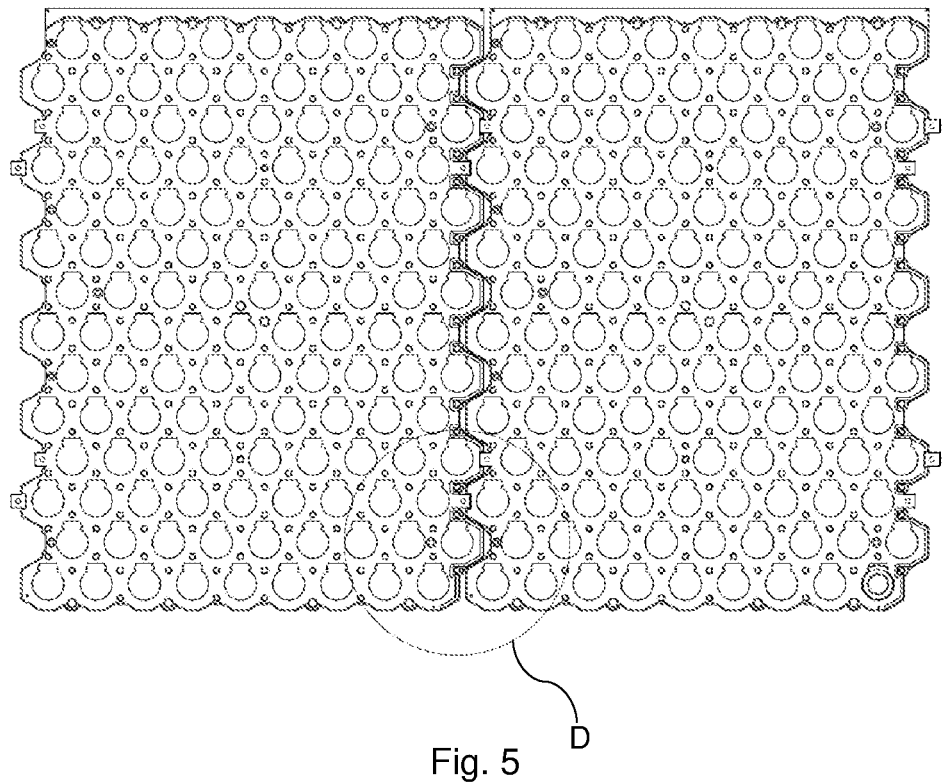
FIG. 5 shows a combined battery tray formed by latching of two battery trays of FIG. 4A.
Figure 5A:
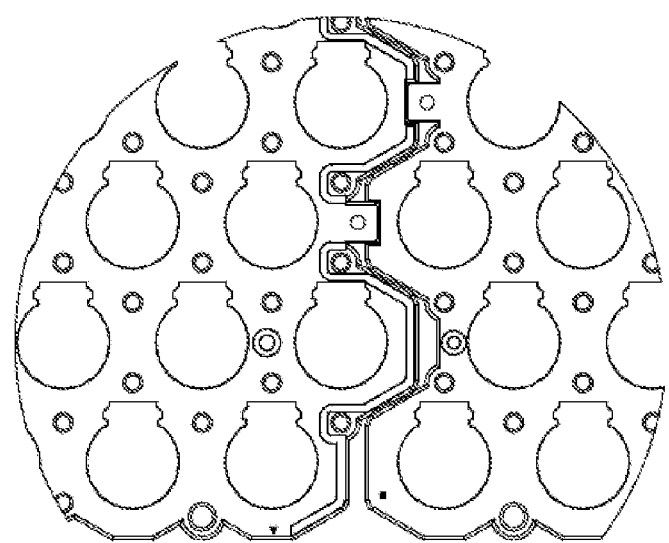
FIG. 5A is an enlarged view of the circled portion (D) of the combined battery tray of FIG. 5, showing interfaces between two battery trays.

A plurality of windows and a corresponding plurality of protrusions are formed on selected locations on the peripheral wall of the first tray side and/or the second tray side. The window is formed as an axially extending slot on a side wall portion of a receptacle which defines part of the side wall of the tray. The protrusion is formed as an axially extending bar which protrudes away from a side wall portion of a receptacle which defines part of the side wall of the tray. A window and a corresponding protrusion of an adjacent tray are complementary to facilitate complementary engagement and latching of adjacent battery trays to form a combined battery tray, as depicted in FIG. 5. The windows and protrusions are disposed such that the first end and the second ends of the component trays are on opposite ends of the tray when combined. This provides flexibility of tray combination so that the trays can be combined to form a battery assembly having the same number of rows as a single tray but a larger number of battery receptacles per receptacle row, or smaller number of battery receptacles per receptacle row.

A combined battery tray having the same number of battery receptacles per receptacle row but a larger number of battery rows, for example, a multiple of the number of receptacle rows, although the component trays are still in side-by-side engagement or latching.

For the avoidance of doubt, the use of ordinal numbers such as first, second, third, fourth, etc., is only for convenience of reference and description and is not meant to indicate a degree of importance or significance, or necessary order or sequence, unless the context otherwise requires.

Where the battery receptacle is an intermediate battery receptacle on an intermediate row, each one of the third sidewall portion and the fourth sidewall portion is a shared sidewall portion which is shared with two abutting battery receptacles of an abutting adjacent receptacle row. More specifically, a third sidewall portion on one intermediate row is a also part of the fourth sidewall portion of a first abutting adjacent battery receptacle and part of the fourth sidewall portion of a second abutting adjacent battery receptacle of first abutting adjacent receptacle row; and a fourth sidewall portion on that intermediate row is a also part of the third sidewall portion of a first abutting adjacent battery receptacle and part of the third sidewall portion of a second abutting adjacent battery receptacle of second abutting adjacent receptacle row.

The peripheral wall of the intermediate portion of the example battery receptacle has the shape of a prismatic hexagon having the receptacle axis as the center axis or the prismatic axis. Each of the first sidewall portion and the second sidewall portion forms a wall of the prismatic hexagon which is orthogonal to the row axis and the first sidewall portion and the second sidewall portion are directly opposite facing. Each of the third sidewall portion and the fourth sidewall portion comprises two abutting sidewalls of the prismatic hexagon. The example battery receptacle has the shape of a regular hexagon such that the sidewalls of the hexagon have same length. The battery receptacles are distributed resembling distribution of cells of a beehive, such that a typical battery receptacle is surrounded in abutment by 6 surrounding battery receptacles and the sidewalls of the typical battery receptacle are shared with the 6 surrounding battery receptacles.

A typical battery receptacle of an intermediate row comprises a first passageway portion which is formed on the third sidewall portion and a second passageway portion which is formed on the fourth sidewall portion. Each passageway portion is parallel to the row axis and is defined by a first slit portion and a second slit portion. The slit portion 143 is formed on a sidewall of the hexagonal battery receptacle which for part of the third sidewall portion or part of the fourth sidewall portion. Each slit portion extends along a slit axis which is parallel to the receptacle axis and orthogonal to the row axis. An intermediate battery receptacle on an intermediate row is a typical battery receptacle in the present context.

Slit portions on the third sidewall portions of the battery receptacles on an intermediate receptacle row forms an ensemble of slit portions. The ensemble of slit portions defines a first passageway which extends across all battery receptacles on the receptacle row to provide a through passage for an inter-battery-row conductor.

Slit portions on the fourth sidewall portions of the battery receptacles on an intermediate receptacle row forms an ensemble of slit portions. The ensemble of slit portions defines a second passageway which extends across all battery receptacles on the receptacle row to provide a through passage for an inter-battery-row conductor.

The battery receptacles on an end row have either a slit third sidewall portion or a slit fourth sidewall which forms a passageway portion through passageway. A flange is formed on one of the end rows and projects away from the battery receptacles in a direction parallel to the distribution axis.

The slit portions of each passageway portion begin from the second axial end of the tray and extends axially towards the first axial end for an axial depth. Each passageway portion has an entry aperture defined by the slit portions to permit a portion of the row link to enter the passageway portion.

The plurality of windows and the corresponding plurality of protrusions cooperate to form a plurality of tray alignment devices. An alignment device is formed on some of the end battery receptacles. The alignment device comprises an axial protrusion and an axial slot which are formed on an end sidewall portion which is not shared with another battery receptacle. The end sidewall portion can be a first sidewall portion or a second sidewall portion. The axial protrusion protrudes away from the end sidewall portion along the row-axis direction and extends in an axial direction which is on the row axis and parallel to the receptable axis. The axial slot has a slot axis which meets the row axis and which extends in an axial direction parallel to the receptable axis. The axial protrusion and the axial slot extend for half or less than the height of the sidewall portion. Height of a sidewall portion is its dimension measured in a direction parallel to the receptacle axis. An axial through bore is formed on the axial protrusion to permit a pin to passthrough to enter onto the bored protrusion of another battery tray when the battery assembly comprises more than one battery tray of batteries.

To assemble a battery module, the first contact tabs of an inter-row connector is inserted into a receptacle row from the second axial end and moved towards the first axial end until the first contact tabs has reached the first axial end of the battery receptacles.

When the first contact tabs have reached its designated position, the row tab 118 of the inter-row connector is in place and seats inside a passageway, with its major surfaces facing the batteries in interconnection and parallel to the battery axes. The row tab penetrates through the row of battery receptacles along a path defined by the passageway and has an end tab portion 118a which projects out of the battery tray. When the row tab is in position, the first contact tabs are in receptacles of one receptacle row and the second contact tabs ate in receptacles of another receptacle row which share the row tab passageway with the receptacle row.

When the first contact tabs have reached the first axial end, the second contact tabs will be on the second axial end of the battery receptacles.

After all the inter-row connectors are in place, the batteries are inserted into the battery receptacles and the battery terminals will be electrically connected with the corresponding contact tabs, for example, by fusion welding such as laser welding or spot welding to integrally connect the battery terminals and the corresponding contact tabs.

Where a battery comprises a plurality of battery modules, a plurality of battery trays of the corresponding plurality of battery modules are placed side by side and inter-row connectors having row tabs which are long enough to pass through the battery modules are placed inside the battery trays and similar steps are to be performed.

In some embodiments, the individual battery modules may be assembled separately, mounted on the main housing and then having the inter-row connectors electrically joined together.

After the battery module or battery modules have been assembled, the base plate is attached to a bottom surface of the battery module(s) by means of an electrically insulating thermal contact medium to complete the construction of a thermal exchange assembly of the power supply apparatus to facilitate effective thermal exchange between the heat transfer network and the base plate. The heat transfer assembly comprises the inter-row connectors of the battery assembly and the base plate as an example of a thermal exchange device. Where the batteries are not connected by inter-row connectors, the heat transfer assembly is formed by an ensemble of individual inter-battery connectors and the thermal exchange device without loss of generality. In this example, the second battery terminal is a negative terminal of a battery and the negative terminals of the batteries of the battery assembly are welded with the second contact tabs which are thermally joined with the base plate. When a battery module is assembled, a battery is received inside a battery receptacle, for example, with its battery axis aligned with the receptacle axis, the first contact tab is proximal to and exposed on the first module surface and is in physically and electrically joined with the first battery terminal, the second contact tab is proximal to and exposed on the second module surface and is in physically and electrically joined with the second battery terminal, and the inter-battery link of an inter-battery connector is inside the battery receptacle and extends between the first contact tab and the second contact tab. An inter-battery link extends between two adjacent receptacles rows and between adjacent receptacles on adjacent receptacle rows. The first link portion of an inter-battery connector is inside the receptacle of one battery while the second link portion of the inter-battery connector is inside the receptacle of another battery. The intermediate link portion or the row link is in both receptacles. A row link portion is held in position by a passageway formed on the battery receptacle and is held on an axial level above an axial end by the slit portion of the battery receptacle. The axial extent of the example slit portions which define a passageway portion on a battery receptacle has an example length of 22 mm, which is about one-third of the axial extent of a typical battery receptacle of the example tray. In general, a slit portion having an axial extent of more than 20%, 25%, 30% and less than 35%, 40% of the axial length of the battery would provide a good balance. The link portions of an inter-battery connector are configured to extend inside the air gap portion of the battery receptacle which is defined by the spacing fins and the battery. The first link portion and the second link portion are laterally displaced since abutting receptacles on abutting receptacle rows are laterally displaced.

In example embodiments such as the present, the first link portion extends axially inside a battery receptacle and the second link portion extends axially inside an adjacent battery receptacle on an adjacent receptacle row. The example first link portion extends and the row link are orthogonal to each other, defining a T-section inside the battery receptacle. The example second link portion extends and the row link are orthogonal to each other, defining another T-section inside a battery receptacle. A T-section formed by two mutually orthogonal tab-portions forms a more stable connector structure inside a battery receptacle. Each battery receptacle has either a first link portion or a second link portion, but not both.

To mitigate risks of electrical contact between adjacent battery terminal contact tabs on abutting receptacle rows while minimizing space between adjacent rows, adjacent rows of contact tabs may be partially insulated electrically. For example, an electrical insulation medium may be applied on a portion of the second tab which is in abutment with the intermediate link portion of an inter-battery connector. In example embodiments, an electrically insulating (preferably non-thermally insulating) tape may be applied across a row of second contact tabs to cover the portions of the second contact tabs which are proximal the intermediate link portions to mitigate potential risks of electrical contact between second contact tabs of abutting receptacle rows. Since the first contact tabs usually have smaller surface dimensions than the second contact tabs, electrical insulation may not be necessary for adjacent rows of first contact tabs.

Referring to FIG. 5, the example battery tray comprises an example plurality of M=14 receptacle rows and an example plurality of N=9 battery receptacles per row. The two battery modules forming the example battery assembly are mounted side-by-side with the rows aligned so that each row of the battery assembly comprises N=18 batteries. The inter-row connector has N first terminal tabs and N second terminal tabs. While the inter-battery connectors are distributed in the row direction and such that adjacent inter-battery connectors have a generally uniform separation distance, the separation distance between two immediately adjacent inter-battery connectors on two adjacent battery trays is larger than the separation distance between two immediately adjacent inter-battery connectors on the same battery tray. With the M rows of batteries in series connection, the battery assembly has an output voltage equal to $MV_b$, where $V_b$ is the voltage of each battery row. For an 18650 battery, $V_b$ is taken as 3.6V and the battery assembly has a voltage of about 50.4V.

When the inter-row connectors and the batteries are duly put in place in the trays and battery assembled, batteries of a receptacle row are in parallel electrical connection and the battery rows or adjacent battery rows are serially connected. When so assembled, the first battery terminals of the batteries in a row are connected to first contact tabs of one inter-row connector and the second battery terminals of all batteries in the row are connected to the second contact tabs of another inter-row connector. The first battery terminals of the batteries in a row are at same electrical potential due to electrical interconnection of the first battery terminals by the row tab of one inter-row connector. The second battery terminals of the batteries in the row are at same electrical potential due to electrical interconnection of the second battery terminals by the row tab of another inter-row connector.

After the battery modules have been assembled, the base plate 120 is attached to the battery modules to form a battery assembly 100. The battery assembly is mounted on the main housing and electrically connected to the battery management circuitry. When the battery assembly is mounted, its top surface is proximal and facing the ceiling of the discharge chamber. The example batteries of the example battery module have a safety vent which is adjacent the positive terminal, which is the first battery terminal. When the battery assembly is duly mounted, the first battery terminals of the battery are aligned on the top surface of the battery tray and are exposed to the air chamber and opposite-facing the ceiling of the air chamber.

Before the battery assembly is mounted on the upper housing portion, thermal sensors are mounted on the discharge chamber to facilitate detection of temperature inside the battery compartment. In this example, the venting apertures are formed on the top wall of the main housing and are symmetrically distributed on two sides of the longitudinal center axis of the main housing. The venting apertures 232 are distributed near the middle portion of the top wall of the upper housing portion. The inner surface of the top wall defines the ceiling of the discharge chamber, which is also the ceiling of the battery compartment since the discharge chamber is a portion of the battery compartment in this example. A thermal sensor is mounted on the venting apertures so that temperature inside the battery compartment can be monitored and temperature of gaseous discharge which exits the battery compartment through the venting apertures can be detected. In some embodiments, the thermal sensor may be mounted on other locations of the battery compartment 106 or the discharge compartment 108 in alternative or as an addition. The battery compartment is configured so that gaseous discharge emanating from a battery of the battery module can only exit through the venting apertures. In example embodiments, the upper housing portion of the main housing is integrally formed of a non-air permeable material (hard plastics) with the venting apertures integrally molded. When the upper housing portion and the battery assembly are duly assembled, the base plate and the upper housing portion cooperate to form an air-tight battery compartment except at the venting apertures.

To facilitate more accurate detection of temperature inside the battery compartment, or more particularly the discharge chamber, which is the portion of the battery compartment intermediate the battery assembly and the main housing, the upper housing portion is made of a thermally insulating material such as hard plastics so that the discharge chamber is thermally isolated from the ambient air to mitigate non-detection of an abnormally high temperature due to heat exchange between air inside the discharge chamber and ambient air through the upper housing portion, such heat exchange may cause a drop in temperature inside the battery compartment and adversely affect accurate detection of adverse battery conditions and timing of activation of counter-measures.

When the battery assembly is in place, the safety vents of the batteries are proximal and exposed to the top surface of the battery assembly and to the discharge chamber. When the safety vent of a faulty battery operates to release hot gas from the battery, the hot gas inside the faulty battery will exit from the top or top portion of the battery as hot gaseous discharge and move directly into the discharge chamber.

A battery may deteriorate and gradually become a faulty battery, for example due to aging and weathering. When a battery becomes a faulty battery, it may begin to have a higher temperature and hot gas may emit from the battery. The initial rate of gaseous emission speed is usually relatively low and the initial hot gas temperature is also relatively low, for example, at between 100-120 degrees Celsius (° C.). When the temperature of the battery increases further to a critical temperature, for example, the melting temperature of the electrode separator of a battery, melt down of the separator will expedite and aggravate battery damage and the temperature of hot gas discharged by a faulty battery can rapidly reach 500 or 650 or even 800 or 1000 degrees Celsius. The high temperature of a faulty battery can spread to adjacent batteries of the battery module and may cause thermal runaway and possible explosion. Electrode separators are typically made of polyethylene, which has a melting temperature 133° C., or polypropylene, which has a melting temperature of 159° C. The melting temperature of the separator may be taken as a critical temperature for battery condition monitoring.

In some embodiments, a first cooling power may be applied when a first activation temperature is detected and a second higher cooling power may be applied when a second, higher, activation temperature is detected after a predetermined time after activation of the cooling power to cool down the battery assembly.

So that temperature inside the battery compartment can be detected without having a thermal sensor for each battery, a number of thermal sensors, which is substantially smaller than the number of batteries, is distributed to detect temperature inside the discharge chamber. The thermal sensors in the present example are distributed inside the discharge chamber and configured to detect temperature of the discharge compartment, which is the portion of the battery compartment proximal to the safety vents of the batteries and defining the discharge chamber.

To mitigate mixing of hot gas discharge emanating from a battery with air in the discharge chamber, the discharge chamber is configured so that gaseous discharge can flow to a venting aperture in a short distance. For example, the venting apertures and the thermal sensors are distributed on the ceiling of the discharge chamber so that hot gas emanating from a battery can travel upwards to the ceiling and then to the venting aperture where or near where a thermal sensor is located.

To minimize distance that the hot gaseous discharge has to travel to reach a thermal sensor or a venting aperture, the axial extent of the discharge chamber is configured to be substantially smaller than the axial extent of the battery compartment. For example, the axial extent of the air chamber may be less than more than 5%, 10%, or 15% but less than 20%, 25% or 30% of the axial extent of the battery compartment. The axial extent of the discharge chamber may be less than 20%, 25%, 30% or 40% and more than 5%, 10% or 15% of the axial extent of the battery assembly.

So that hot gaseous discharge can be guided to move only through a short distance in the discharge chamber before reaching a closest thermal sensor or a closest venting aperture which is closest to the discharging battery, a plurality of fluid movement guides is formed on the ceiling to surround a venting aperture. Each fluid movement guide defines a guide track which is radially extending with respect to the venting aperture and the guide tracks formed by a plurality of fluid movement guides define a plurality of tapered channels each of which tapers to narrow on extending towards the venting aperture. The guide tracks extend orthogonally to the axial direction of the battery assembly, which is also the axial direction of the battery, and provides a guide for the hot gaseous discharge to move from the safety vent of the battery to the venting aperture 232 in a short distance and minimize mixing of the hot gas discharge with air of the air chamber so that the temperature of the hot gaseous discharge is substantially maintained when arrived at the thermal sensor, also known as temperature sensor.

The end tab portions 118a of the inter-row connectors at the end rows of the battery assembly are connected to power input and power output terminals of the apparatus. The end tab portions of the inter-row connectors of the intermediate rows are connected to the battery management circuitry to facilitate management of battery voltage at each battery row.

In example embodiments, the control circuitry is configured to monitor temperature of the batteries by monitoring temperatures at the plurality of venting apertures, for example, by means of thermal sensors. When the temperature detected at a venting aperture exceeds a predetermined threshold value, safety measures may be activated by the control circuitry. The safety measures may include shut down of a battery module, isolation of batteries or battery groups, for example, by fuses, or activation of cooling measures by operation of the fans. When battery cooling measures are activated within a short time of detecting an alert temperature, movement of cooling air through the air compartment which hopefully rapidly cool down a damaged battery or damaged batteries to below a critical temperature, above which the risks of battery melt down due to thermal runaway may increase substantially.

In some embodiments, active cooling measures, for example, by use of thermoelectric cooling devices such as Peltier devices may further expedite the cooling process. The active cooling elements may be attached to the thermal exchange device and/or on the bottom portion of the main housing as a convenient example.

As the inter-battery connectors are directly connected to the battery terminals, especially the battery terminal when a battery safety vent is located, the network of inter-battery connectors functions as a heat transfer network for transfer heat from interior of the batteries to the thermal exchange device. Furthermore, the configuration of the inter-battery connectors, especially the configuration of the intermediate link portion as comprising exposed metal flaps also helps to dissipate heat during normal operation of the battery assembly and helps to maintain the battery to operate at preferred or desirable operating temperatures.

During operations, if an activation temperature is detected by a thermal sensor, the control circuitry will activate counter-measures to cool down the battery assembly to prevent or mitigate risks of thermal runaway and possible meltdown. In example embodiments, once a critical temperature is detected by a thermal sensor, say 80° C. or 90° C., the fans will be activated to accelerate heat exchange between the battery module and the air in the air compartment and the process would help to cool down the battery assembly. In some embodiments, active thermal cooling may be used in addition or as an alternative. In some embodiments, external fans may be used and cold air may be supplied by an external source. The battery groups may also be shut down, for example by fusible links upon detection of a critical temperature. In some embodiments, the control circuitry may operate to shut down a battery module or the battery assembly when the temperature reaches a second, higher temperature, say 100° C. A battery module may be shut down, for example, by isolation by electronic switches such as semiconductor switches or fuses. In addition, the control circuitry may generate an alert signal when a critical temperature has reached. The alert signal may include a local alarm on the apparatus and/or a remote alarm to be sent out of the apparatus, for example, via a telecommunication network through a telecommunication frontend of the apparatus.

A thermal exchange assembly of the present disclosure is configured as a heat sink, and more specifically, a distributed heat sink comprising a distributed heat transfer network formed by the inter-battery connectors. The thermal exchange assembly as a distributed heat sink has an inherent ability to equalize temperature of batteries forming a battery module or a battery assembly. The temperature equalizing ability can be enhanced by active cooling by forced air movement or thermal electric cooling to expedite thermal exchange with the thermal exchange assembly.

Batteries typically have a specified operation temperature range, which is defined between a minimum operation temperature and maximum operation temperature. Most Li-ion cells are manufactured to operable below a maximum temperature of around 60~65° C. An operation temperature which is well below the maximum temperature is generally preferred for longer battery life and longer-term safety.

The example apparatus may be configured so that the batteries are to operate at a preferred operation temperature range which is an intermediate temperature range selected between the maximum temperature and the minimum temperature. For example, the apparatus may be configured to operate so that the operation temperatures of the batteries are kept at or below an upper temperature limit, say 40° C. or 42° C. When batteries reach the upper temperature limit, the control circuitry will activate the cooling arrangement to bring the battery temperatures down towards the lower limit of the intermediate temperature range, for example, to bring down to the upper temperature limit or at a few degrees, say 1, 2, or 3 degrees, below, and the process will continue and repeated. In general, an intermediate temperature range of between 25° C. and 42° C. has been found to be preferable.

The control of battery operation temperature in an intermediate temperature range which is selected between the maximum and minimum temperatures requires more extensive and accurate battery temperature monitoring. To facilitate more extensive and accurate battery temperature monitoring, a plurality of temperature sensors such as temperature probes are placed inside the battery receptables to monitor battery temperatures and control operation of the cooling arrangement by the control circuitry.

The temperature sensors may be utilized to control temperature imbalances among batteries of the battery assembly or module. For example, when a temperature imbalance exceeding an imbalance threshold is detected, the control circuitry will operate the cooling arrangement to bring the battery temperatures down, wherein the temperature imbalance is mitigated. An example imbalance threshold may be selected as between 3-5° C. as a convenient example.

The heat transfer network comprises a matrix of thermal transfer members which is physically connected to the battery assembly and extends through the battery receptacles of the battery assembly. The thermal transfer member has a first end which is physically connected to a first battery terminal of one battery and a second end which is connected to a second battery terminal of another battery. The second end of the thermal transfer member is also connected to a main thermal exchange device, which is physically connected to an axial end of the battery assembly. The main thermal device has a thermal contact surface which is in physical contact with the thermal transfer network but is electrically insolated therefrom. The main thermal exchange device has a thermal exchange surface which is physically connected with the thermal contact surface for efficient heat transfer. In example embodiments, the thermal exchange surface and the thermal contact surface are opposite facing major surfaces of a conductive plate such that the thermal exchange surface and the thermal contact surface are integrally connected by a thermally and electrically conductive material. In some embodiments, the thermal contact surfaces are delineated into a plurality of insulated or isolated electrically conductive regions and each electrically conductive region is for making thermal but not electrical contact with a group of heat transfer members such as an array or of hear transfer members. The heat transfer members are connected to thermal contact surface by a thermal conductive medium which is electrically insulating to block electrical contact between the heat transfer network and the main thermal exchange device. The thermal transfer members are arranged in arrays or rows and the arrays or rows of thermal transfer members extend in an axial direction which is generally orthogonal to the thermal contact surface to form a 3-dimensional heat transfer assembly. An example heat transfer member is also an inter-battery connector comprising a first batter terminal tab which is in physical and electrical contact with a first battery terminal and an inter-battery link which extends inside and through a battery receptacle to reach the thermal contact surface.

Figure 6:
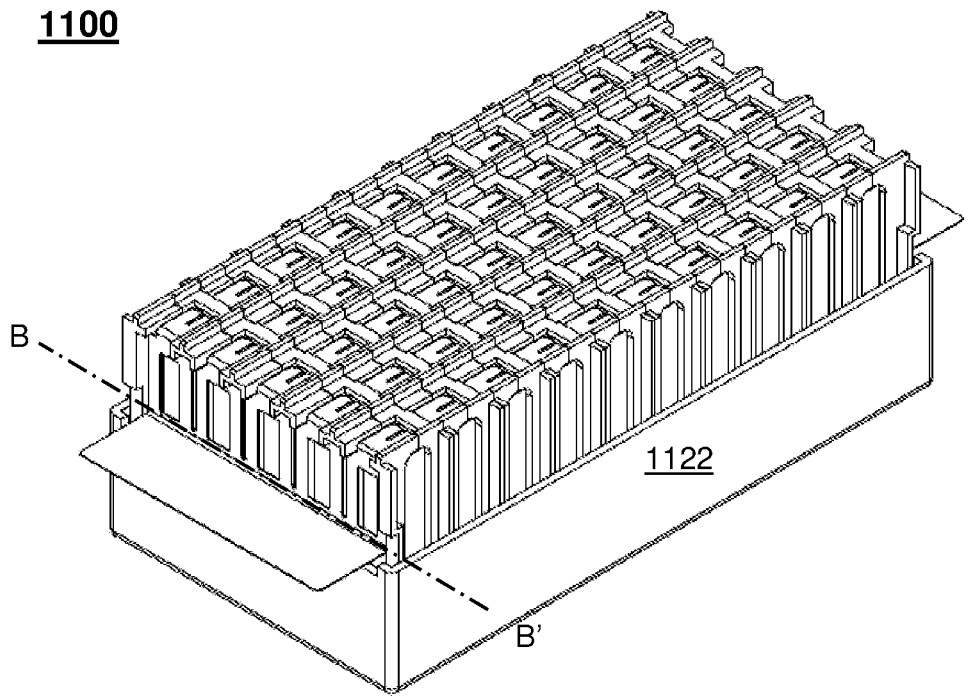
FIG. 6 shows an example battery assembly according to another aspect of the present disclosure.
Figure 6A:
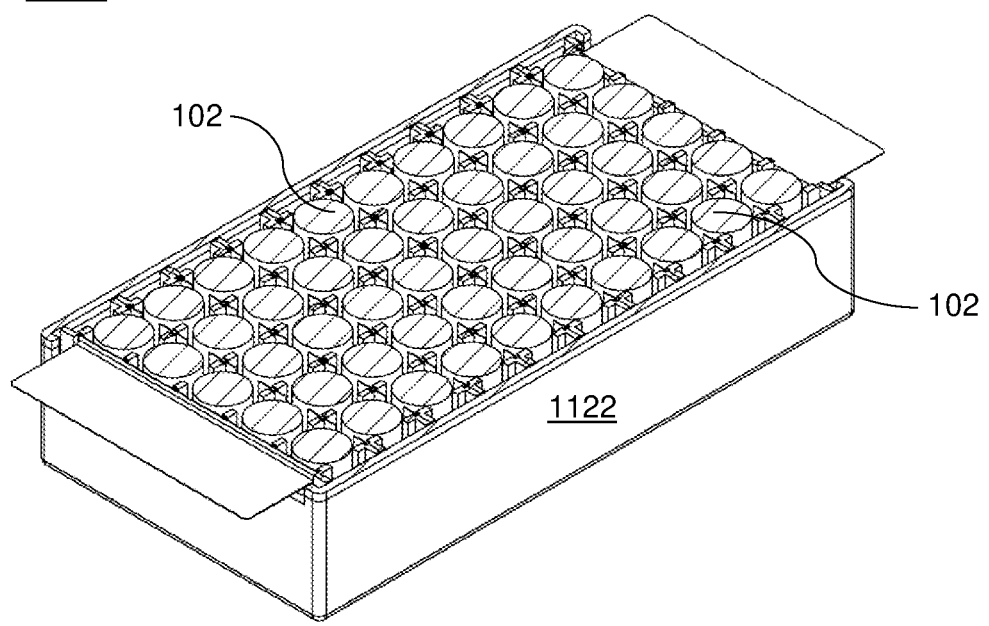
FIG. 6A is a cross-sectional view of the example battery assembly of FIG. 6, taken alone a plane orthogonal to the battery axes.
Figure 7A:
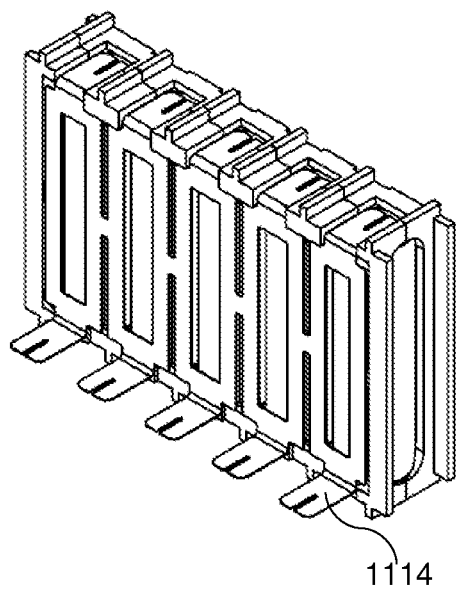
FIG. 7A shows an example sub-assembly of the battery assembly of FIG. 6.
Figure 7B:
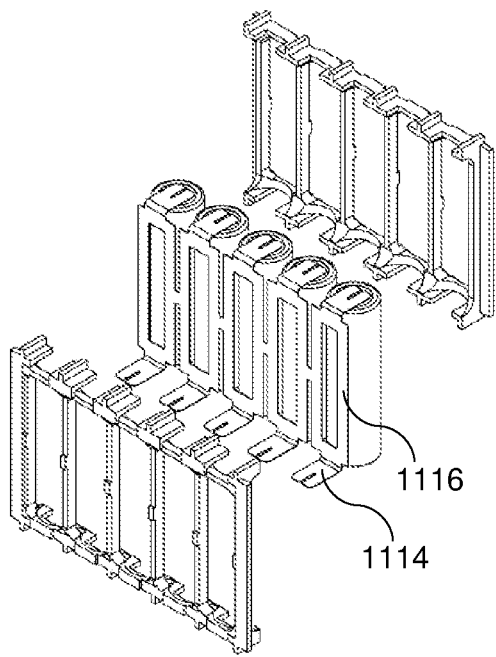
FIG. 7B is an exploded view of the sub-assembly of FIG. 7A.
Figure 7C:
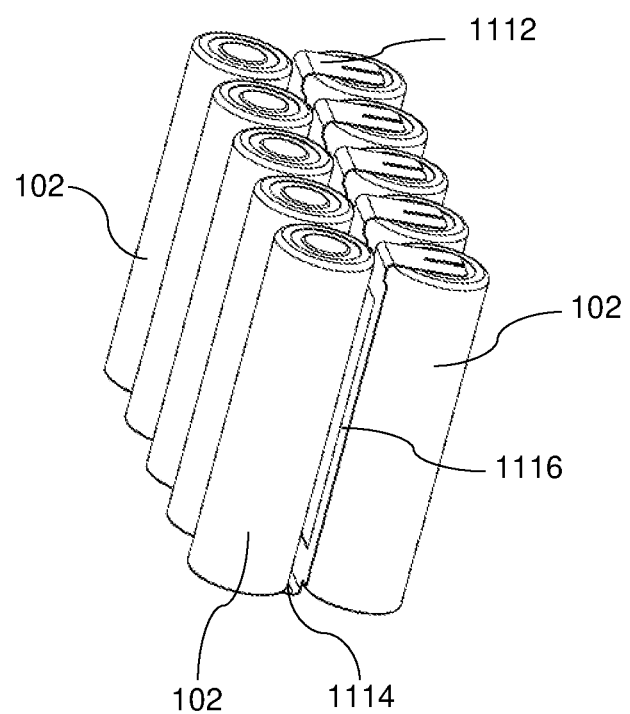
FIG. 7C shows interconnection of two rows of batteries by an inter-row connector.
Figure 8:
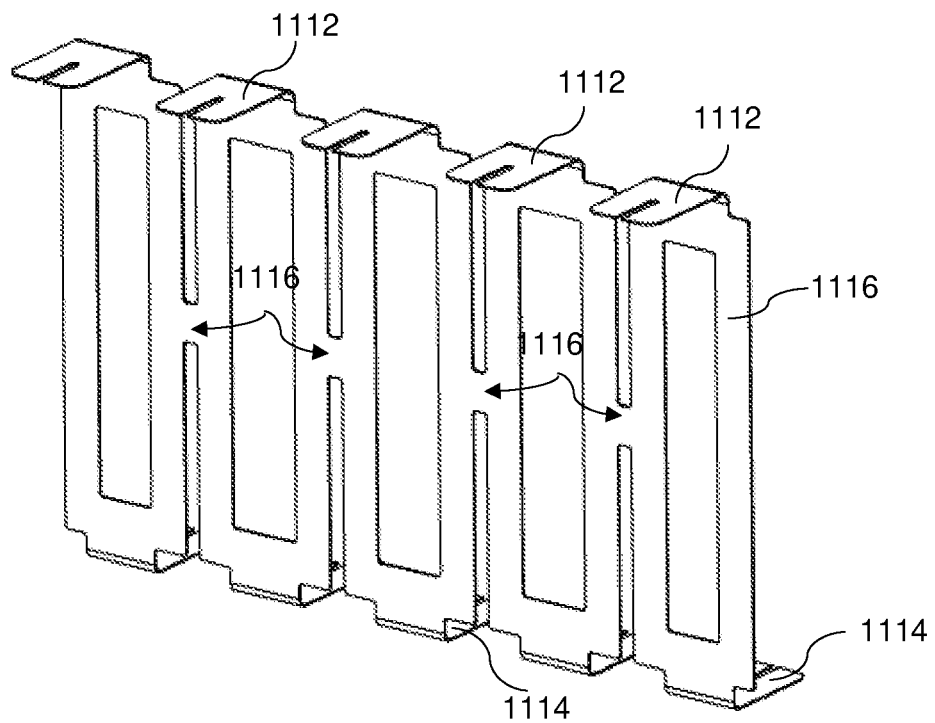
FIG. 8 is a perspective view of an example inter-row connector.

An example battery assembly 1100 comprises an example plurality of batteries connected in parallel and in series, as depicted in FIGS. 6 and 6A. The plurality of batteries is held inside a battery tray which is formed from a corresponding plurality of battery receptacles. The example battery tray comprises an example plurality of M=10 receptacle rows for receiving a corresponding plurality of M=10 receptacle rows of batteries, with each row comprising an example plurality of N=5 battery receptacles for receiving a corresponding plurality of N=5 receptacle rows of batteries. Each example receptacle row is formed by two modular members, for example, made of hard plastics and by snap-fitting, as depicted in FIGS. 7A and 7B. An adjacent pair of rows of batteries, consisting of two rows of batteries, are connected in series by an inter-row connector, as shown in FIG. 7C. Each inter-row connector comprises a plurality of N inter-battery connectors and each inter-battery connector comprises a first battery terminal contact tab 1112, a second battery terminal contact tab 1114 and an inter-terminal tab 1116 which interconnects the first battery terminal contact tab 1112 and the second battery terminal contact tab 1114, as shown in FIG. 8. A window or aperture, which extends for a substantial portion of the axial length of the inter-battery connector is formed on the inter-terminal tab 1116.

To assemble a battery row of batteries in parallel, an inter-row battery connector is attached to a plurality of batteries forming a battery row, as depicted in FIG. 7B, and the modular members are fitted together to form a sub-assembly of FIG. 7A. When the battery row is assembled, the first battery terminal contact tab 1112 is on a first axial end of the battery receptacle and in physical and electrical contact with the first battery terminal, the second battery terminal contact tab 1114 projects from the second end of the battery receptacle and extends into another row for making physical and electrical contact with the second battery terminal of a battery in another row, and the inter-terminal tab 1116 extends axially inside the battery receptacle between the first axial end and the second axial end of the battery receptacle of the battery having its first terminal connected with the first battery terminal contact tab 1112. The batteries and the battery receptacles forms a battery module which is received inside a metal casing 1122, the metal casing has a bottom portion having an inner surface which is in thermal contact with the second battery terminals of the batteries forming the battery module and the bottom portion is functionally equivalent to the base plate 112 of the example apparatus of FIG. 1.

Figures 9, 9A:
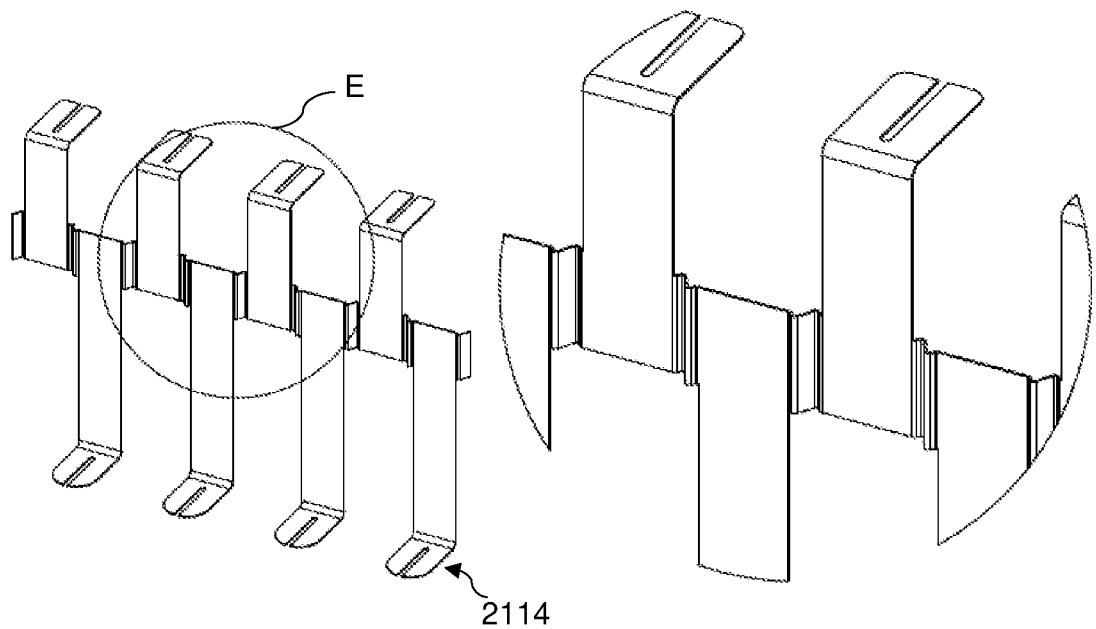
FIG. 9 is a perspective view of another example inter-row connector.
FIG. 9A shows an enlarged view of the circled portion (E) of FIG. 9.

In the example battery assembly 1110 of FIG. 6, the battery rows are organized in the form of a rectangular matrix so that the plurality of batteries are arranged into rows and columns, wherein a column is orthogonal to a row. In such example embodiments, the first battery terminal contact tab 1112 and the second battery terminal contact tab 1114 are laterally aligned, that is, aligned in the direction of a column or Y-direction, although the first battery terminal contact tab 1112 and the second battery terminal contact tab 1114 are on opposite sides of the inter-terminal tab 1116.

Where batteries forming a battery module or a battery assembly are not aligned in a rectangular matrix, the first battery terminal contact tab and the second battery terminal contact tab will be laterally offset without loss of generality, for example, as depicted in FIGS. 9 and 9A.

Apart from the differences, the inter-row connector 1110 is similar to the inter-row connector 110 and the description herein in relation to the inter-row connector 110 is incorporated herein by reference and is to apply mutatis mutandis, with numeral values increased by 1000.

While the present disclosure is described with reference to embodiments, the embodiments are non-limiting implementation examples. For example, while the example battery module comprises cylindrical batteries, non-cylindrical batteries may be used to build the battery assembly without loss of generality. While the example apparatus comprises an air compartment to define a path for air circulation and a fan compartment to move air, the air compartment and the fans and/or compartment are not essential. For example, the thermal exchange surface may be exposed to ambient air and air may be circulated by external air moving arrangements without loss of generality. While the main housing of the example apparatus comprises an upper housing portion and a lower housing portion, there is no limitation in the placement direction and the main housing may be partitioned or oriented in other directions. For example, the upper housing may be the lower housing, the lower housing may be the upper housing and the main housing may comprise left housing and right housing without loss of generality. Furthermore, while the battery trays provide a robust structure to hold the batteries of the example battery assembly, the batteries may be mounted on other holding structures without loss of generality.

The invention claimed is:

1. A power supply apparatus comprising a main housing, a battery assembly and battery management circuitry;
   wherein the main housing comprises a battery compartment and an air compartment,
   wherein the battery compartment includes a discharge chamber and the battery assembly is inside the battery compartment such that the battery assembly is intermediate the discharge chamber and the air compartment,
   wherein the battery assembly comprises a plurality of batteries and the batteries have safety vents, and the safety vents are arranged to release gaseous discharge into the discharge chamber,
   wherein the battery assembly comprises a thermal exchange arrangement which is configured to facilitate thermal exchange between the battery assembly and air inside the air compartment,
   wherein the thermal exchange arrangement comprises a thermal exchange device, wherein the thermal exchange device is in thermal connection with the battery assembly and partitions the main housing to form the battery compartment and the air compartment, and wherein the thermal exchange device comprises a thermal exchange surface which is thermally exposed to the air compartment,
   wherein a plurality of venting apertures is distributed on a top portion of the discharge chamber, the top portion defining a ceiling of the discharge chamber, and wherein the battery compartment is an air-tight compartment except at the plurality of venting apertures,
   wherein each venting aperture of the plurality of venting apertures is equipped with a thermal sensor so that the plurality of venting apertures is equipped with a corresponding plurality of thermal sensors,
   wherein the thermal sensors are positioned to detect temperature of gaseous discharge at the venting apertures, and wherein each thermal sensor is connected to deliver detected temperature information to a temperature monitoring circuit of the battery management circuit; and
   wherein the battery management circuitry comprises control circuitry which is configured to activate a countermeasure or a temperature conditioning arrangement to provide cooling to the battery assembly by moving ambient air through the air compartment to prevent thermal runaway of the battery assembly when detected temperature reaches an activation threshold temperature.

2. The power supply apparatus of claim 1, wherein the control circuitry is configured to activate the counter-measure or the temperature conditioning arrangement to provide the cooling to the battery assembly when there is a temperature imbalance among batteries of the battery assembly which exceeds an imbalance threshold.

3. The power supply apparatus of claim 1, wherein the thermal exchange arrangement comprises a heat transfer network and the thermal exchange device, wherein the heat transfer network is configured to collect heat from terminals of the batteries of the battery assembly and transfer to the thermal exchange device, and wherein the thermal exchange device is configured to exchange heat with air inside the air compartment.

4. The power supply apparatus of claim 3, wherein the heat transfer network is configured to transfer heat from electrodes of batteries of the battery assembly to the thermal exchange device, and wherein the thermal exchange device comprises a base plate having an upper surface which is a heat collection surface for collecting heat from the batteries of the battery assembly and a lower surface which is the thermal exchange surface functioning as a heat discharge surface for dissipating heat into the air compartment.

5. The power supply apparatus of claim 3, wherein the thermal exchange surface functions as a heat dissipation surface to dissipate heat received from the battery assembly into the air compartment.

6. The power supply apparatus of claim 3, wherein the thermal exchange device comprises a base plate which is a thermally conductive plate that partitions the main housing to form the battery compartment and the air compartment, wherein the battery assembly has a bottom surface and battery contact tabs exposed on the bottom surface, and wherein the battery contact tabs exposed on the bottom portion of the battery assembly are joined to an upper surface of the base plate by an electrically insulating, thermally conductive medium.

7. The power supply apparatus of claim 3, wherein the thermal exchange device comprises a thermally conductive plate having a thermal contact surface that is thermally connected to battery terminals of the battery assembly by means of the heat transfer network, the thermal contact surface and the thermal exchange surface being opposite-facing major surfaces of the thermally conductive plate.

8. The power supply apparatus of claim 7, wherein the thermally conductive plate is a base plate which partitions the main housing into the battery compartment and the air compartment.

9. The power supply apparatus of claim 3, wherein the heat transfer network is in thermal and electrical connection with battery terminals of the battery assembly.

10. The power supply apparatus of claim 9, wherein the thermal exchange device is electrically insulated from the heat transfer network.

11. The power supply apparatus of claim 3, wherein the battery assembly comprises a plurality of inter-battery connectors which electrically interconnects the plurality of batteries of the battery assembly, wherein the plurality of inter-battery connectors forms the heat transfer network; and wherein an inter-battery connector of the plurality of inter-battery connectors comprises a first contact tab, a second contact tab, and an inter-terminal tab which interconnects the first contact tab and the second contact tab.

12. The power supply apparatus of claim 3, wherein the battery assembly comprises a plurality of battery groups and adjacent battery groups are interconnected by a respective inter-battery-group connector such that the battery assembly comprises a plurality of inter-battery-group connectors, and wherein each inter-battery-group connector of the plurality of inter-battery-group connectors is formed as a metal grating, and the respective metal gratings of the plurality of inter-battery-group connectors form the heat transfer network.

13. The power supply apparatus of claim 12, wherein each inter-battery-group connector of the plurality of inter-battery group connectors comprises a plurality of inter-battery connectors, and an inter-battery connector of the plurality of inter-battery connectors comprises a first contact tab connected to a first battery terminal having a first electrical polarity, a second contact tab connected to a second battery terminal having a second electrical polarity opposite to the first electrical polarity, and an inter-terminal tab which is an inter-battery link interconnecting the first contact tab and the second contact tab; and wherein the inter-terminal tab has an axial length.

14. The power supply apparatus of claim 1, wherein the power supply apparatus further comprises an electrical-powered air-moving arrangement, and the control circuitry is configured to activate the electrical-powered air-moving arrangement to generate forced air movement to provide active cooling to the battery assembly.

15. The power supply apparatus of claim 1,
wherein the main housing includes a first housing portion, the first housing portion cooperating with the battery assembly to define the discharge chamber,
wherein the first housing portion includes the top portion and the ceiling of the discharge chamber, and
wherein the battery assembly is maintained at an axial level from the ceiling such that the safety vents of the batteries are proximal to and facing the ceiling of the discharge chamber.

16. The power supply apparatus of claim 15, wherein the battery assembly has an axial extent and the axial level that is maintained between the battery assembly and the ceiling of the discharge chamber is smaller than 25% of the axial extent of the battery assembly.

17. The power supply apparatus of claim 15, wherein the first housing portion is made of a thermally insulating material so that the discharge chamber is thermally insulated from ambient conditions to facilitate temperature monitoring.

18. The power supply apparatus of claim 1, wherein the control circuitry is to activate the counter-measure to cool down the battery assembly once a critical temperature is detected by the thermal sensors, and to shut down the battery assembly when the detected temperature is higher than the critical temperature.

* * * * *